United States Patent
Olnowich

Patent Number: 6,044,059
Date of Patent: Mar. 28, 2000

[54] METHOD AND APPARATUS FOR MINIMIZING CONTENTION LOSSES IN NETWORKS

[75] Inventor: Howard Thomas Olnowich, Endwell, N.Y.

[73] Assignee: International Business Machines Corporation, Armonk, N.Y.

[21] Appl. No.: 08/883,487

[22] Filed: Jun. 26, 1997

[51] Int. Cl.[7] .............................. G06F 11/00; H04L 12/50; H04M 3/00

[52] U.S. Cl. .......................... 370/225; 370/384; 370/388; 340/826; 379/272

[58] Field of Search ....................... 370/238, 388, 370/351, 380, 411, 384, 357, 387, 225; 340/825.79, 825.8, 826, 825.03, 827; 379/271, 272, 273

[56] References Cited

U.S. PATENT DOCUMENTS

| | | | |
|---|---|---|---|
| 4,991,168 | 2/1991 | Richards | 340/825.8 |
| 4,991,203 | 2/1991 | Kakizawa | 379/209 |
| 5,099,509 | 3/1992 | Morganstein et al. | 379/84 |
| 5,099,511 | 3/1992 | Matsumoto | 379/198 |
| 5,345,229 | 9/1994 | Olnowich et al. | 370/360 |
| 5,404,537 | 4/1995 | Olnowich et al. | 370/388 |
| 5,444,705 | 8/1995 | Olnowich et al. | 370/388 |
| 5,451,936 | 9/1995 | Yang et al. | 340/826 |
| 5,835,024 | 11/1998 | Olnowich et al. | 370/388 |

FOREIGN PATENT DOCUMENTS

| | | | |
|---|---|---|---|
| 2-237335 | 9/1990 | Japan | H04L 12/02 |
| 5-344146 | 12/1993 | Japan | H04L 12/48 |

OTHER PUBLICATIONS

NEC Corp., *Camp–on system for data communication between terminal and computer.* WPAT AN 90–331157/44 JP J02237335–A 90.09.19. No abstract.

NEC Corp., *Camp–on system for stored programme electronic swithcing.* WPAT AN 88–170557/25 JP J63107264–A 88.05.12. No abstract.

*Primary Examiner*—Alpus H. Hsu
*Assistant Examiner*—Afsar M. Qureshi
*Attorney, Agent, or Firm*—Shelley M Beckstrand

[57] ABSTRACT

Contention losses are minimized in path searching, circuit-switched networks by adding intelligence to the last stage of the network. A count of number of bytes remaining to be transferred in each active message is maintained in real time for each output port of the network. If contention arises at the last stage switch being requested in camp-on mode to make a connection to a busy output port, the switch checks the bytes remaining count and responds differently depending on how the bytes remaining count compares to a preset threshold register. If the count remaining is below the threshold, the last stage switch accepts the camp-on request, because the desired output port will be available shortly. If the count remaining is above the threshold or below the threshold but another user is camped-on, the switch rejects the camp-on request to the last stage, because the desired output port will not be available shortly. In this case further path searching would be meaningless. A different message to a different destination (output port) is tried, and later the contended message is retried.

27 Claims, 38 Drawing Sheets

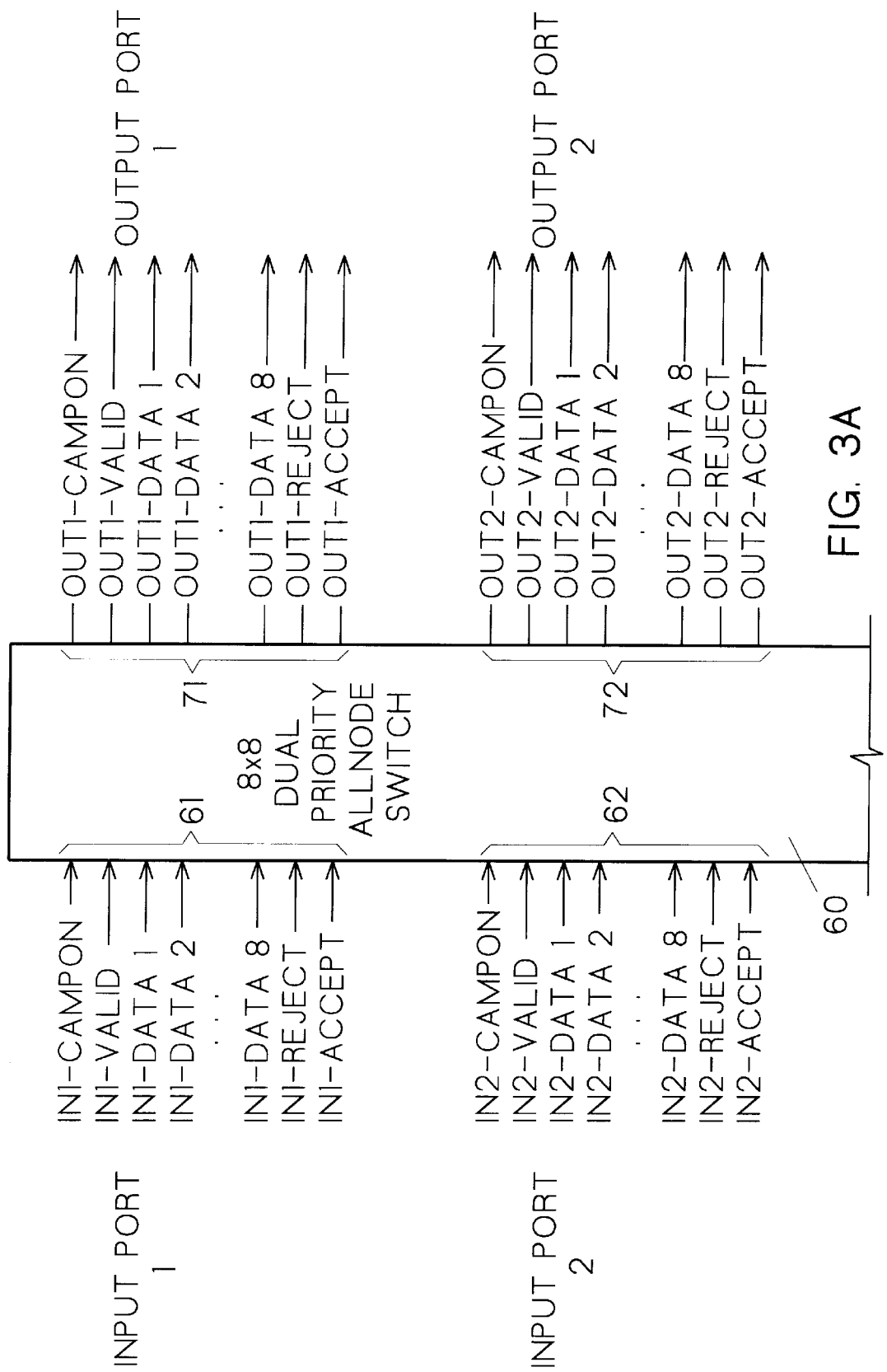

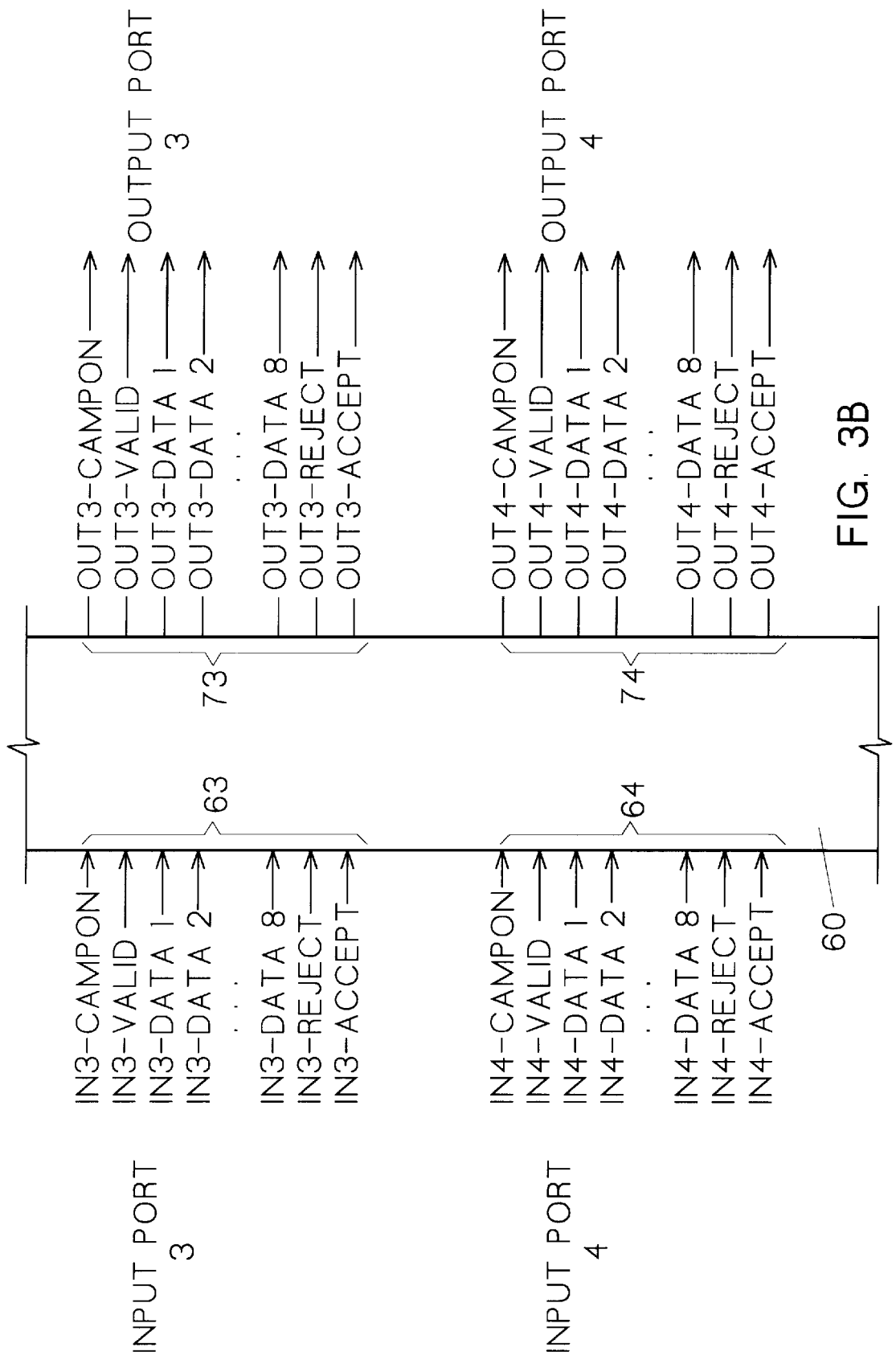

| FIG. 4A |
|---|
| FIG. 4B |
| FIG. 4C |
| FIG. 4D |
| FIG. 4E |

FIG. 4

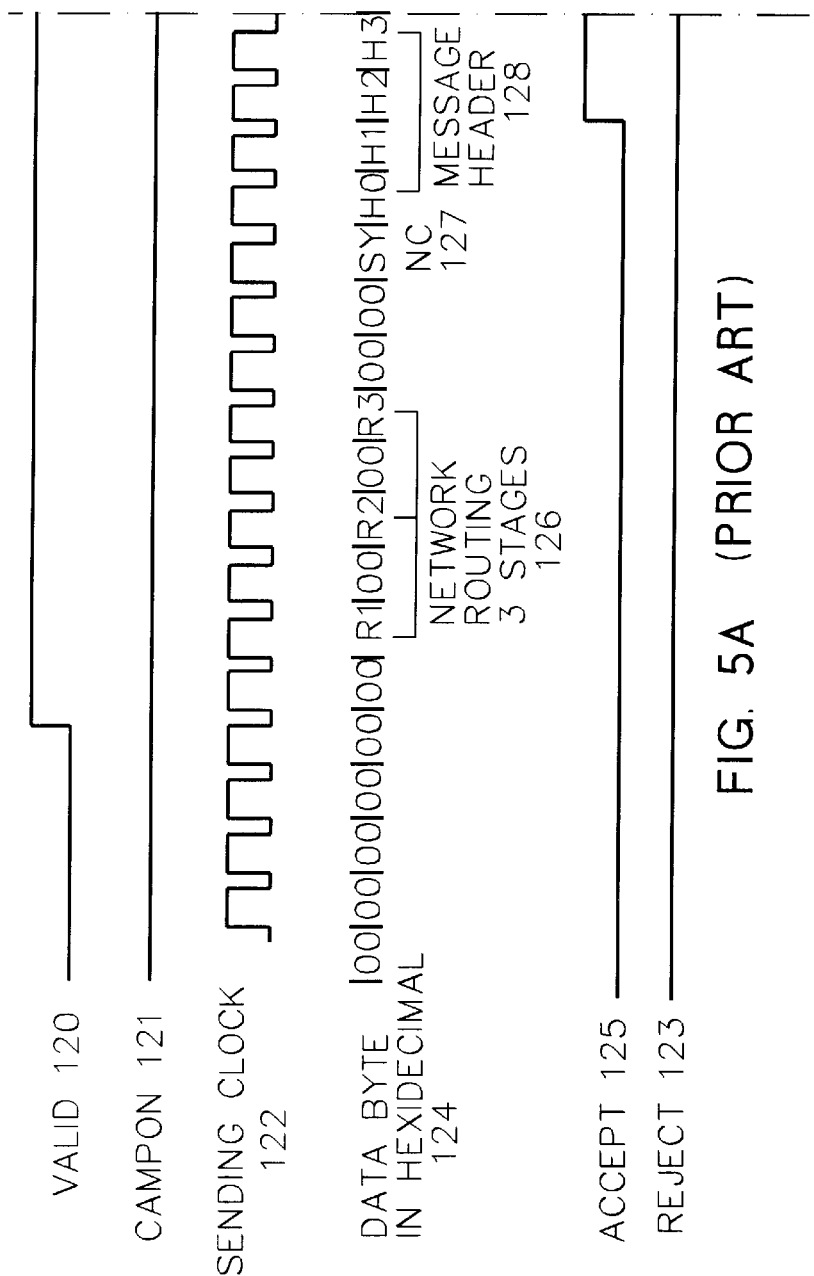
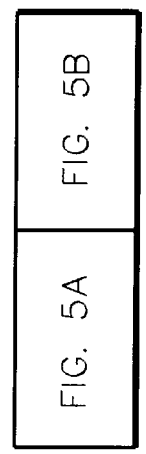
FIG. 5A (PRIOR ART)
FIG. 5

BIT 31 — SWITCH COMMAND = 1
BIT 30 — ENABLE CAMP-ON REJECT
BIT 29 — LOAD SWITCH THRESHOLD REGISTER
BIT 28 — RECEIVE MESSAGE TO RCV FIFO 1
BIT 27 — RECEIVE MESSAGE TO RCV FIFO 2
BIT 26 — RECEIVE MESSAGE TO RCV FIFO 3
BIT 25 — 16 — DESTINATION ADDRESS OVER THE NETWORK
BIT 15 TO 0 — WORD COUNT OF MESSAGE NOT INCLUDING MESSAGE HEADER (MESSAGE MUST BEGIN AND END ON 32-BIT WORD BOUNDARIES)

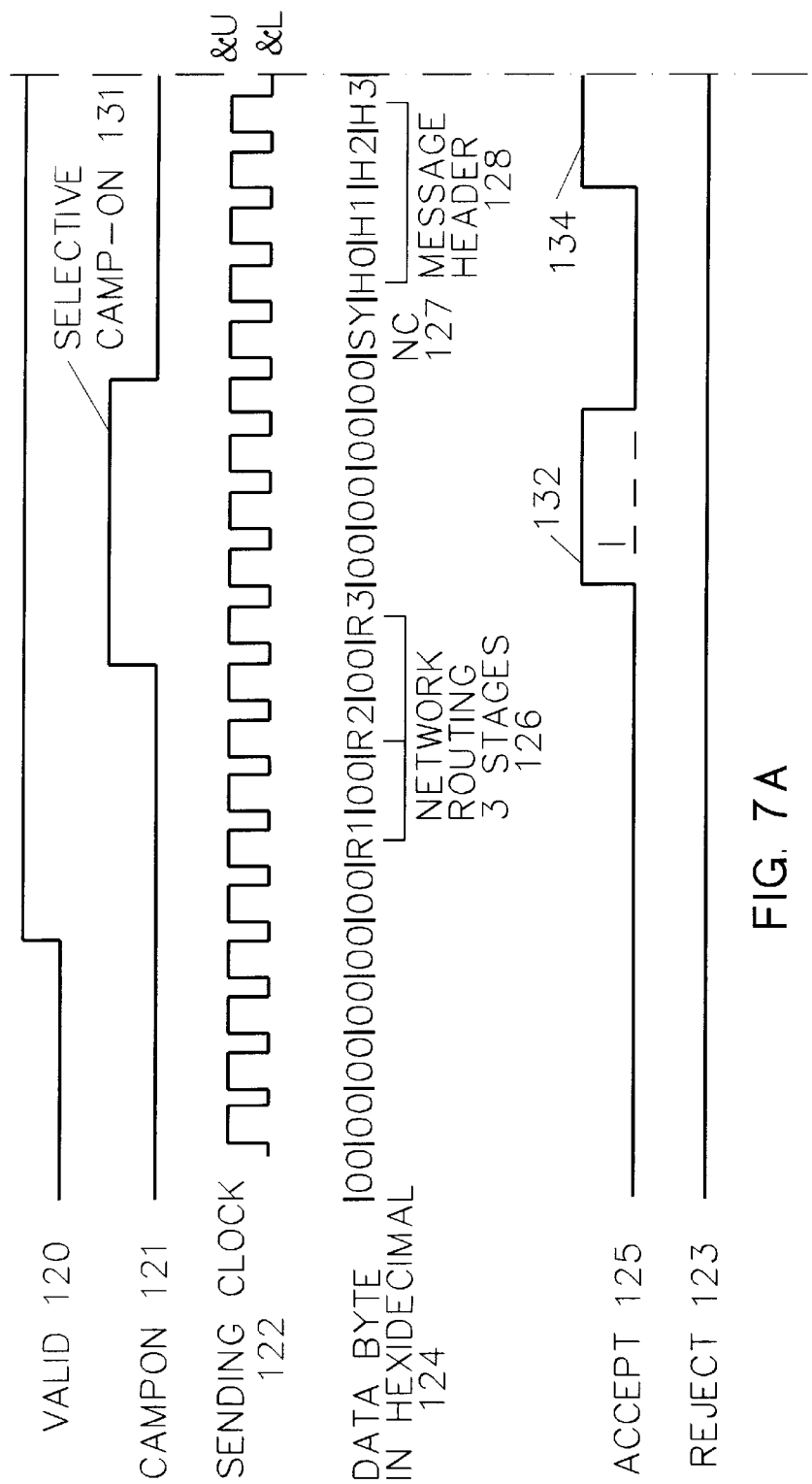

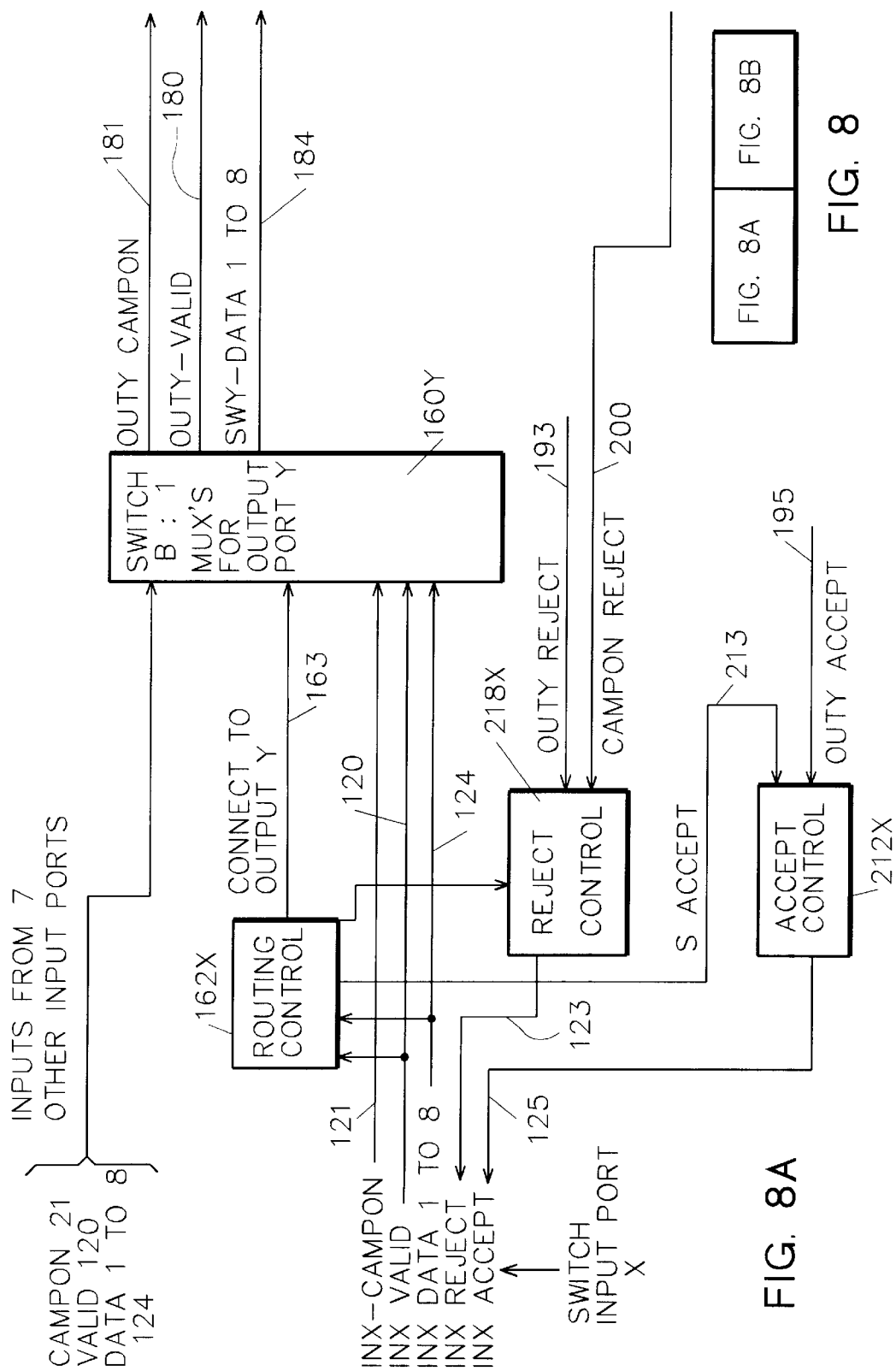

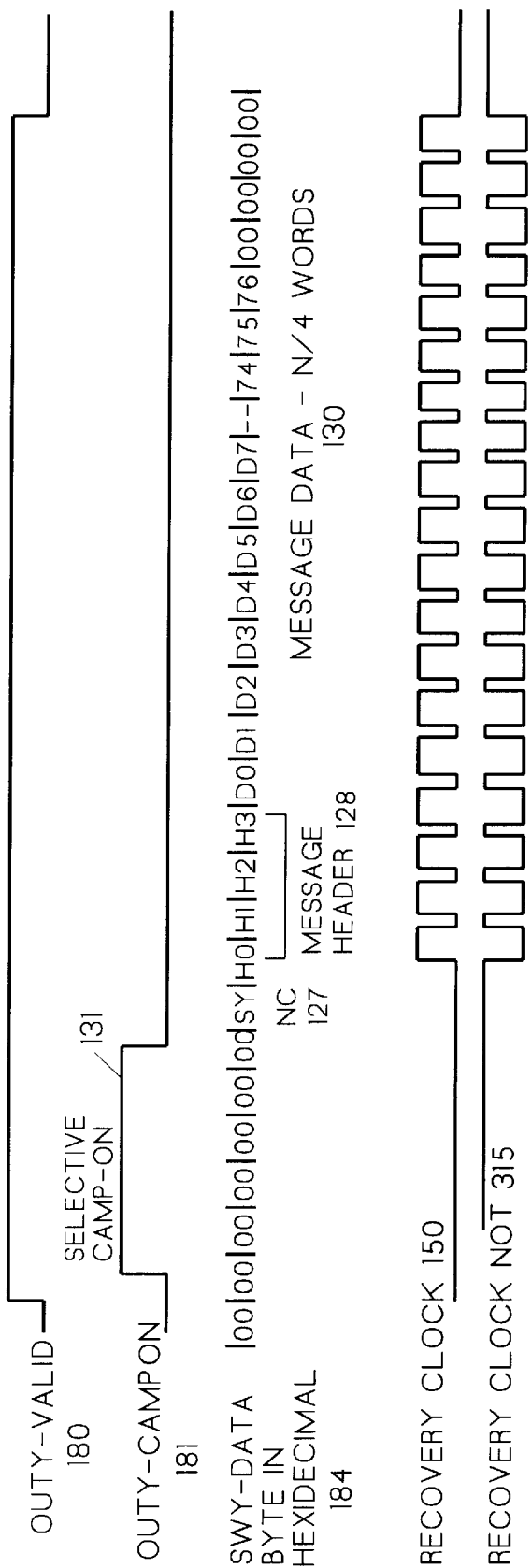
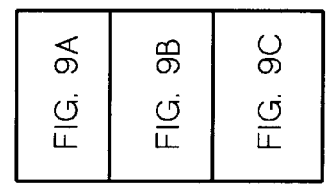
FIG. 9A
FIG. 9

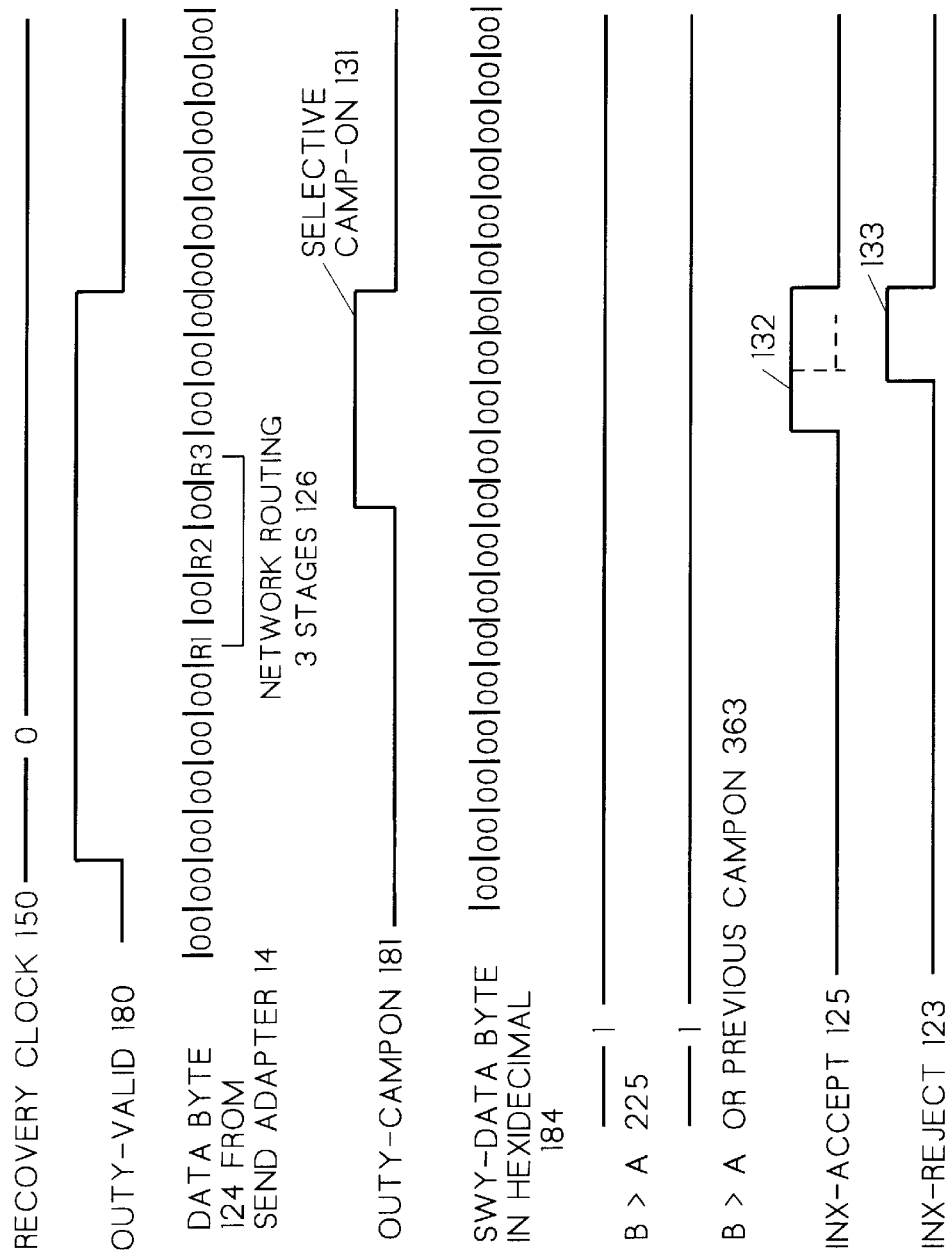

BIT 31 – ENABLE SELECTIVE CAMP-ON 580
BIT 30 – ENABLE CAMP-ON 581
BIT 29 TO 27 – NUMBER OF STAGES 573 – 3 BITS
BITS 26 TO 0 – NOT USED ff# METHOD AND APPARATUS FOR MINIMIZING CONTENTION LOSSES IN NETWORKS

BACKGROUND OF THE INVENTION

1. Technical Field of the Invention

This invention relates to digital parallel processing systems, wherein a plurality of nodes communicate via messages over an interconnection network. In particular, this invention deals with networks including circuit switches which do not store and forward the message within the network. This invention further relates to performance improvement techniques for unoffered networks comprising self-routing switches which include intelligence for minimizing contention problems.

2. Background Art

In parallel systems, a plurality of nodes communicate via messages sent over an interconnection network. Each node usually interfaces to the network via a network adapter.

For self-routing circuit-switched networks, as described in U.S. patent application Ser. No. 08/606,232, filed Feb. 23, 1996 (assignee docket EN991017XI) for "Multifunctional Network", a network adapter sending a message (the sending adapter) searches for a non-blocked alternate path through the network. This search is conducted by trying one alternate path at a time until a successful connection is made across the network to a receiving adapter at another node. An unsuccessful attempt to find a path results in the network returning a rejection signal to the sending adapter to indicate that the attempt has failed. The sending adapter responds by selecting a different alternate path and attempting again to send the message.

The path searching approach for establishing a connection across the network is improved by the dual priority switches in U.S. Pat. No. 5,444,705, "Dual Priority Switching Apparatus for Simplex Networks" by Olnowich et al. The dual priority switch permits the "Multi-Function Network" to make a connection across the network by either path searching or using the camp-on method. The camp-on method uses a high priority path through the network, which proceeds to make connections at each stage of the network until blockage is encountered. Thereupon, the high priority connection command being blocked is stored at the switch stage at the point of blockage and held pending until the blockage ends. Thus, the desired connection to a switch output port that is busy is camped-on until the desired output port becomes available.

Further network performance enhancements featuring non-blocking networks are disclosed in U.S. patent application Ser. No. 08/762,763, filed Dec. 10, 1996 (assignee docket EN995041), for "TWO-TAILED ADAPTER FOR SCALABLE, NON-BLOCKING NETWORKS" by Olnowich. Non-blocking means that the network will never prevent the connection of two idle nodes attached to the network. That is, when a non-blocking network searches for a path across the network, it will always find at least 1 available path. Thus, the problem of the network preventing a connection from being made is solved.

However, further problems exist which can prevent connections from being successful across the network. The prime problem for a non-blocking network is contention. Contention means that two or more users are competing for the same resource at the same time. In relation to networks, contention means that two or more sending adapters are competing to make a connection to the same receiving adapter on the other side of the network at the same time. In a non-blocking network, any sending adapter will find a path across the network to any receiving adapter; but, if there is contention, even if that path is found across the network, the connection still cannot be made. In a typical example, node 1 is sending a message to node 20, and node 2 also wants to send a message to node 20. Node 2 makes it across the network, but cannot connect because node 20 is busy being connected to node 1.

A good solution for resolving contention, if the message is short, is the camp-on approach discussed above. This means that the path node 2 found across the network will be held active, and node 2 will wait for node 1 to finish its message. Then node 2 will proceed. However, the use of the camp-on method can defeat the non-blocking characteristic of the network. If two or more paths across the network are being held active waiting to make connection to the same contended destination, a possibility is created in the network where some other sending adapter might no longer be able to find a path across the network to an idle node. This is because more than one path is being dedicated to the node in contention. These periods of possible blocking in the network, will probably go unnoticed if the messages being transferred are short.

However, a problem arises for long messages, such as movie segments or data bases. The camp-on approach then becomes self-defeating in that it solves the contention problem in the best way possible (wait for the contended node to become available), but it creates blocking problems in the network for long periods of time.

Consequently, it as an object of this invention to provide a system which minimizes the losses due to contention in non-blocking networks. It is a further object of the invention to minimize such losses when transmitting long messages.

SUMMARY OF THE INVENTION

The apparatus of the invention is a switching network, comprising a plurality of switch stages including a first stage, at least one middle stage, and a last stage. A send adapter is provided for routing a data message through the plurality of switch stages to the last stage. The data message selectively includes a camp-on command to the last stage. The last stage includes logic responsive to the camp-on command for selectively accepting or rejecting the camp-on command.

The method of the invention provides for transferring data messages across an unbuffered switching network including a plurality of switch stages from a sending adapter to a last stage output port. The sending adapter selects an alternative path through the plurality of switch stages and selectively issues a camp-on command to the last stage. The last stage is operated selectively to accept or reject the camp-on command.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 3, 3A through 3D show the interfaces to the 8×8 Allnode Dual Priority Switch, which is the base switch of the network according to the preferred embodiment of this invention.

FIGS. 4, 4A through 4E show a typical non-blocking network for 32 nodes including 3 stages of switches according to the preferred embodiment of this invention.

FIGS. 5, 5A and 5B are a timing diagram for a byte-wide message transfer transmitted over the network according to the preferred embodiment of this invention.

FIGS. 7, 7A and 7B are a timing diagram showing the commanding of a selective camp-on to the last stage of the network according to the preferred embodiment of this invention.

FIGS. 8, 8A and 8B are a block diagram of the selective camp-on function at the switch according to the preferred embodiment of this invention.

FIGS. 9, 9A and 9B, 9C are a timing diagram showing the timing for the recovery of a message arriving at a switch input port and the basic timing for snooping and decrementing the message byte count for selective camp-on at the last stage of the network according to the preferred embodiment of this invention.

FIGS. 10, 10A through 10C are block diagrams showing further details of the message byte count control and bytes remaining counter according to the preferred embodiment of this invention.

FIG. 13 is a timing diagram showing the timing sequence for rejecting a message when the output port is previously camped-on or is busy transferring a previous message and the number of bytes left to be transferred for the previous message is greater than the count in Threshold Register 220 according to the preferred embodiment of this invention.

BEST MODE FOR CARRYING OUT THE INVENTION

Figure 1:
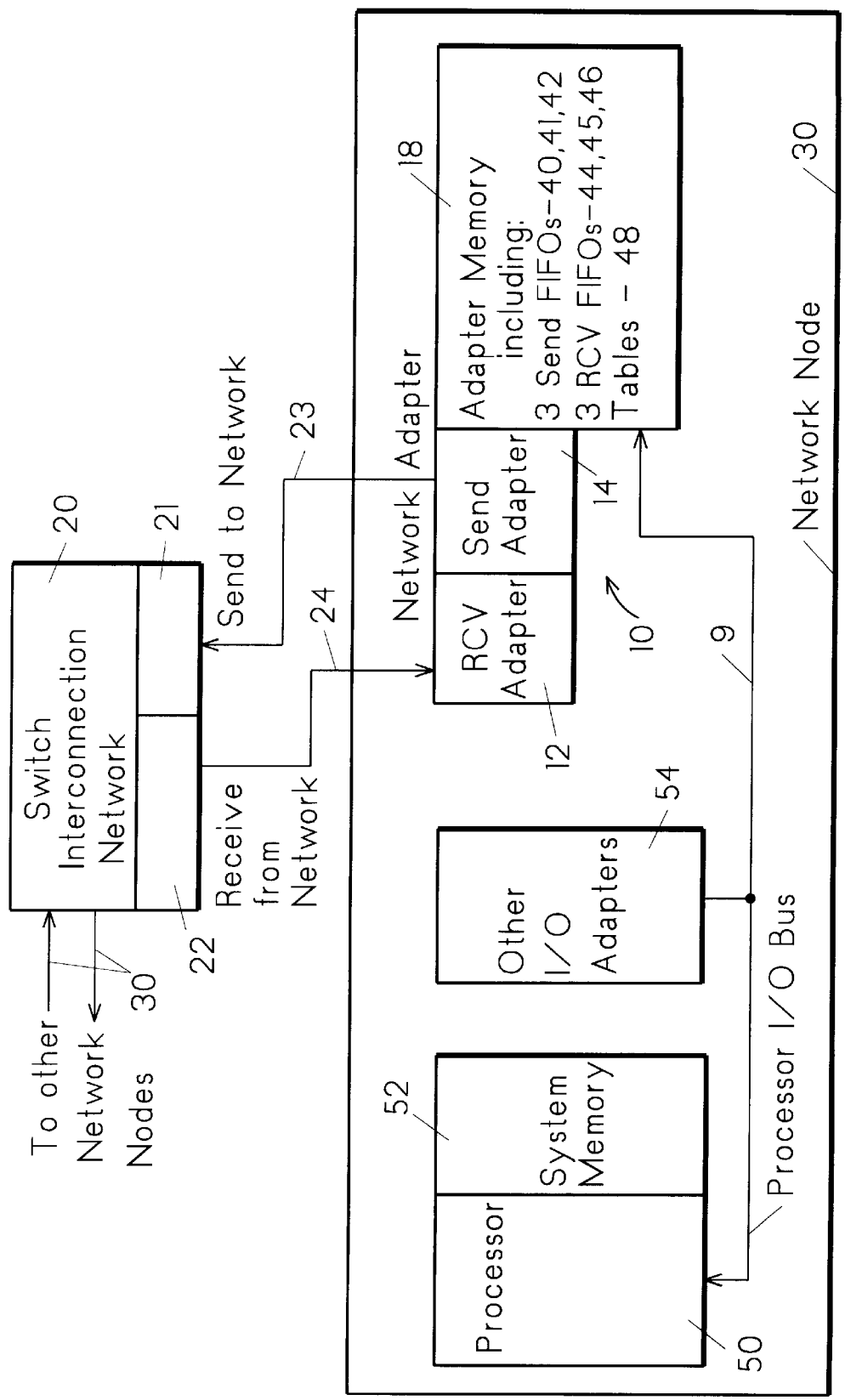
FIG. 1 is a diagram of a typical digital network showing the interconnection of a network node to the network and the components of the network node according to the preferred embodiment of this invention.

In parallel systems, a plurality of nodes communicate via messages sent over an interconnection network. Each node usually interfaces to the network via a network adapter.

In accordance with this invention, a method and apparatus incorporating intelligence in the last stage of multi-stage networks and in the network sending adapter is provided to better handle the contention problem. The first and middle stages of the network provide alternate paths and give the network the characteristic of being non-blocking, but the last stage is susceptible to contention.

Several elements comprising the system of the invention are as follows:

1) Selective camp-on logic which is active only for the last stage of the network; i.e., the sending adapter never issues camp-on to the switches in the first or middle stages of the network. These first and middle stages provide the alternate paths, and camping-on those stages would be self-defeating and cause a high rate of blocking in the network.

2) A software setable rejection threshold register is implemented in the last stage switch chip. The rejection threshold register is programmable by the processor software at any node on the network, and indicates when to accept and when to reject camp-on commands.

3) Logic incorporated at every output port of the last switch stage for snooping the byte count of all messages being transferred through any output port of the last stage switch. The switch stores the snooped bytecount and decrements the stored count as each byte is transferred. Thus, the output ports at the last switch stage maintain in real time a count of the number of bytes remaining to be transferred in the active message. If contention arises by the last stage switch being commanded in camp-on mode to make a connection to a busy output port, the switch checks the bytes remaining count and responds differently depending upon how the count compares to the rejection threshold. If the count remaining is below the rejection threshold, the switch indicates to the sending adapter that it is accepting the camp-on command, because the desired output port will be available shortly. The sending adapter then holds the network connection up to the last stage, and camps-on the last stage waiting for the active message to complete. As soon as it completes, the switch indicates to the sending adapter that it can continue—this is normal camp-on operation except that it is a selective camp-on and only occurs at the last stage of the network.

If the count remaining is above the rejection threshold or below the threshold but another user is already camped-on, the switch indicates to the sending adapter that it is rejecting the camp-on command at the last stage, because the desired output port will not be available shortly. The sending adapter, when getting a rejection to a camp-on command, realizes that further retries over different alternate paths at this time would be meaningless and only clog the network. The sending adapter proceeds instead to other activities, such as waiting or trying a different message to a different destination, and returns to retry this contended message later.

4) A control register is implemented in the sending adapter for enabling the selective camp-on feature and defining the number of stages in the network. This provides the intelligence required for determining when to issue selective camp-ons and for software enabling and disabling of the invention.

Referring to FIG. 1, a typical network node 30 for implementing the system of the invention is set forth. Node 30 attaches to one port of network 20 in full duplex over busses 23 and 24 and contains Network Adapter 10 which converts processor I/O Bus 9 for communication to the network 20. Processor 50, including system memory 52, and I/O adapters 54 also reside on I/O bus 9. Network adapter 10 includes 1) send adapter 14 which transmits messages over bus 23 from the network adapter 10 to other network adapters attached to network 20, 2) receive (RCV) adapter 12 which receives messages over bus 24 from the other network adapters attached to network 20, and 3) adapter memory 18 comprising an area of memory dedicated to three Send FIFOs 40, 41, 42; an area of memory dedicated to three Receive (RCV) FIFOs 44, 45, 46; and an area of memory dedicated to tables 48.

Identical copies of node 30 are connected to each bi-directional port of the network 20, where each bi-directional port comprises one port 21 into the network (sending port with respect to network adapter 10) and one port 22 from the network (receiving port with respect to network adapter 10). Sending adapter 14 at this node 30 sends a message over bus 23 across network 20 and bus 24A to RCV adapter 12 at another node 30A.

Figure 2:
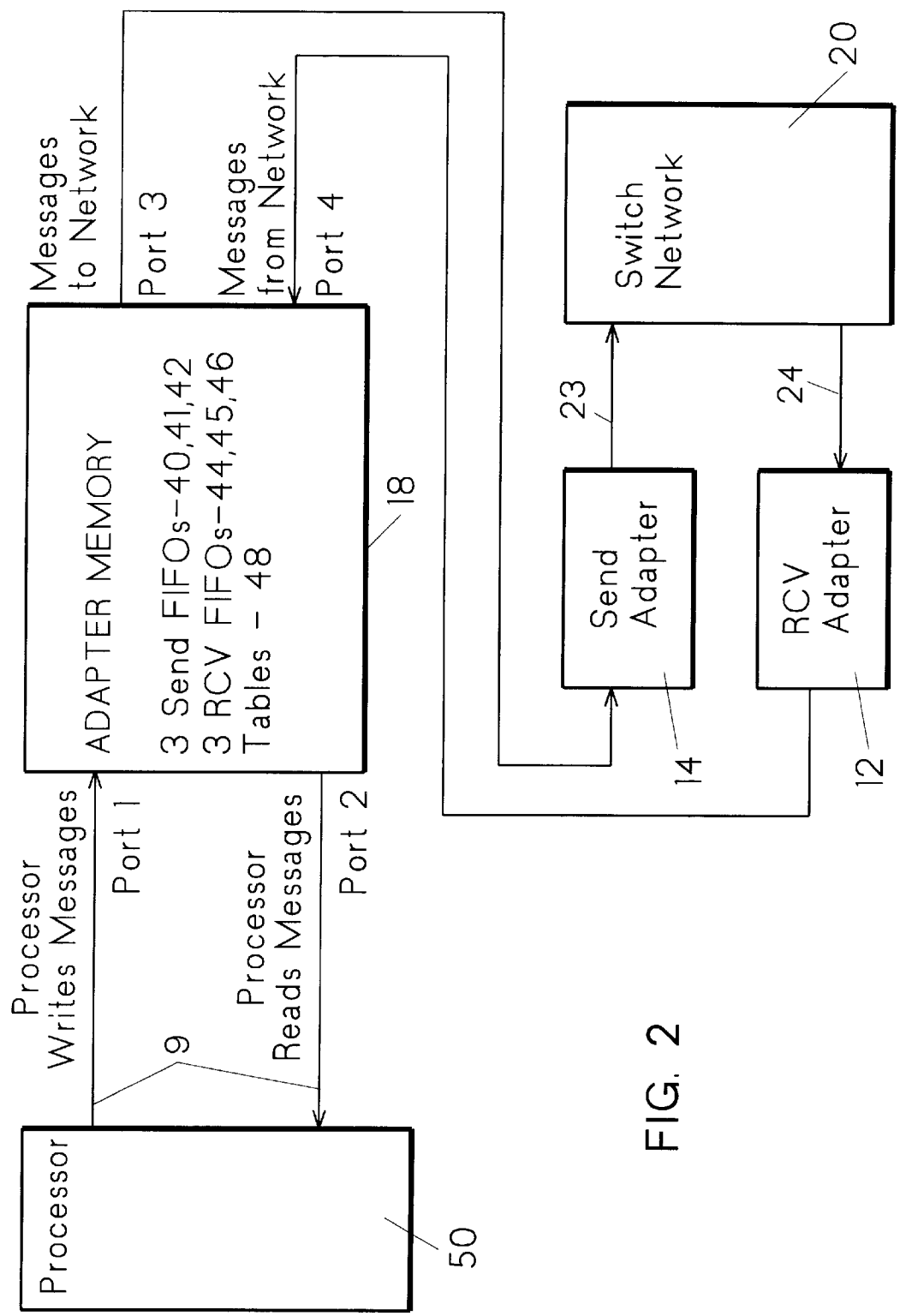
FIG. 2 is a diagram showing the 4-ported memory resident at the network adapter of FIG. 1 for storing and forwarding messages to/from the network.
Figure 3C:
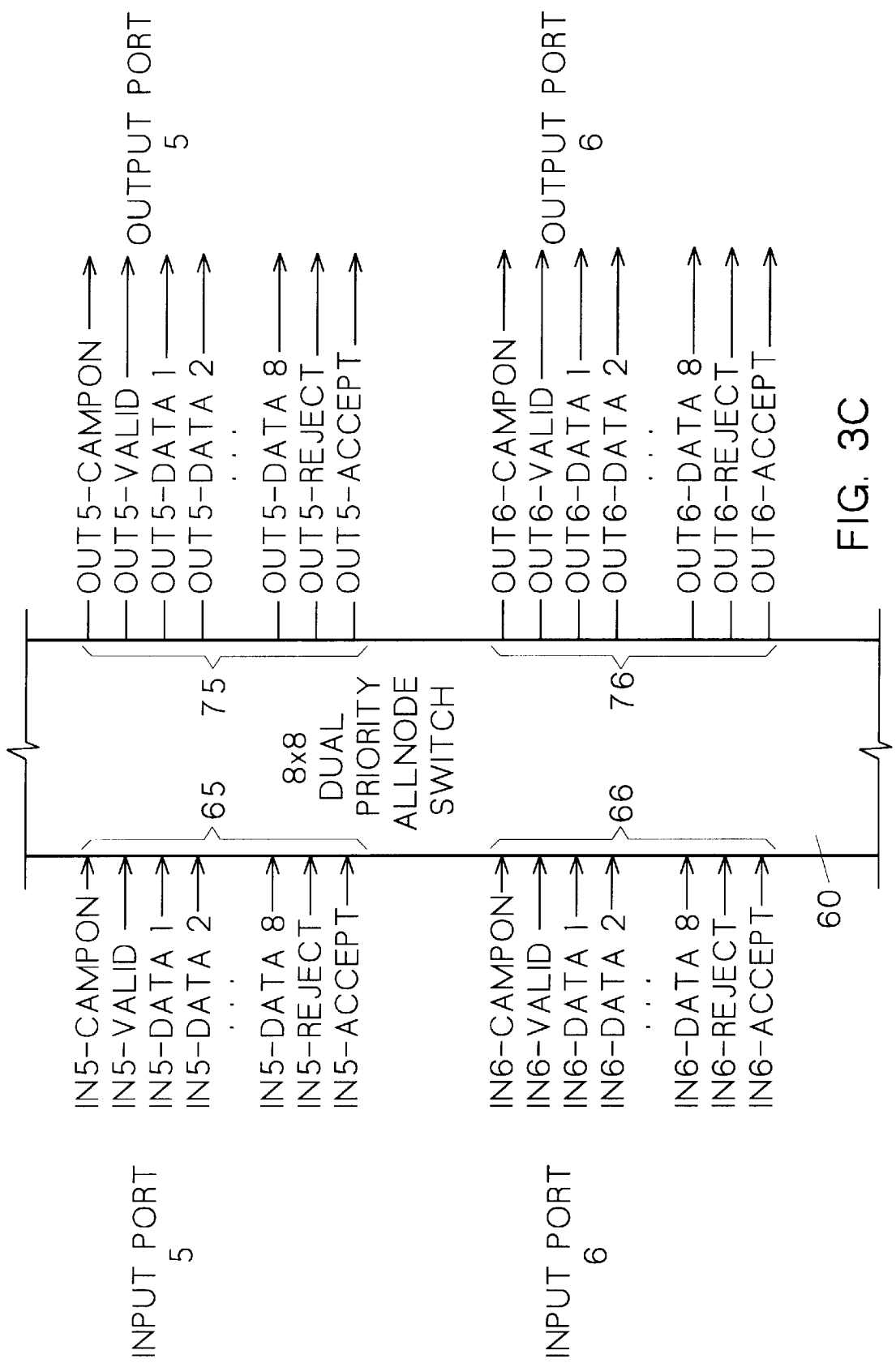
Figure 3D:
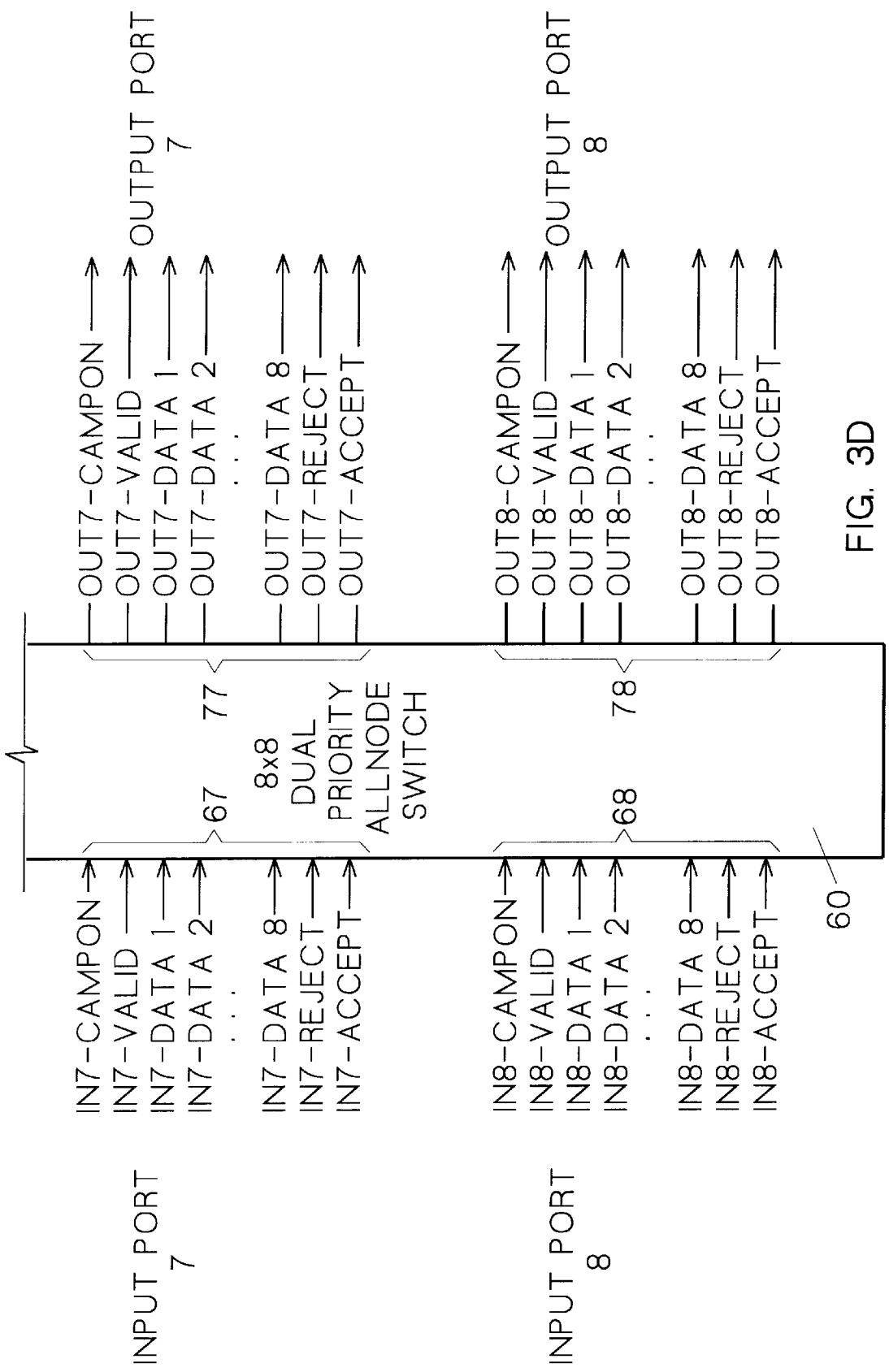
Figure 4A:
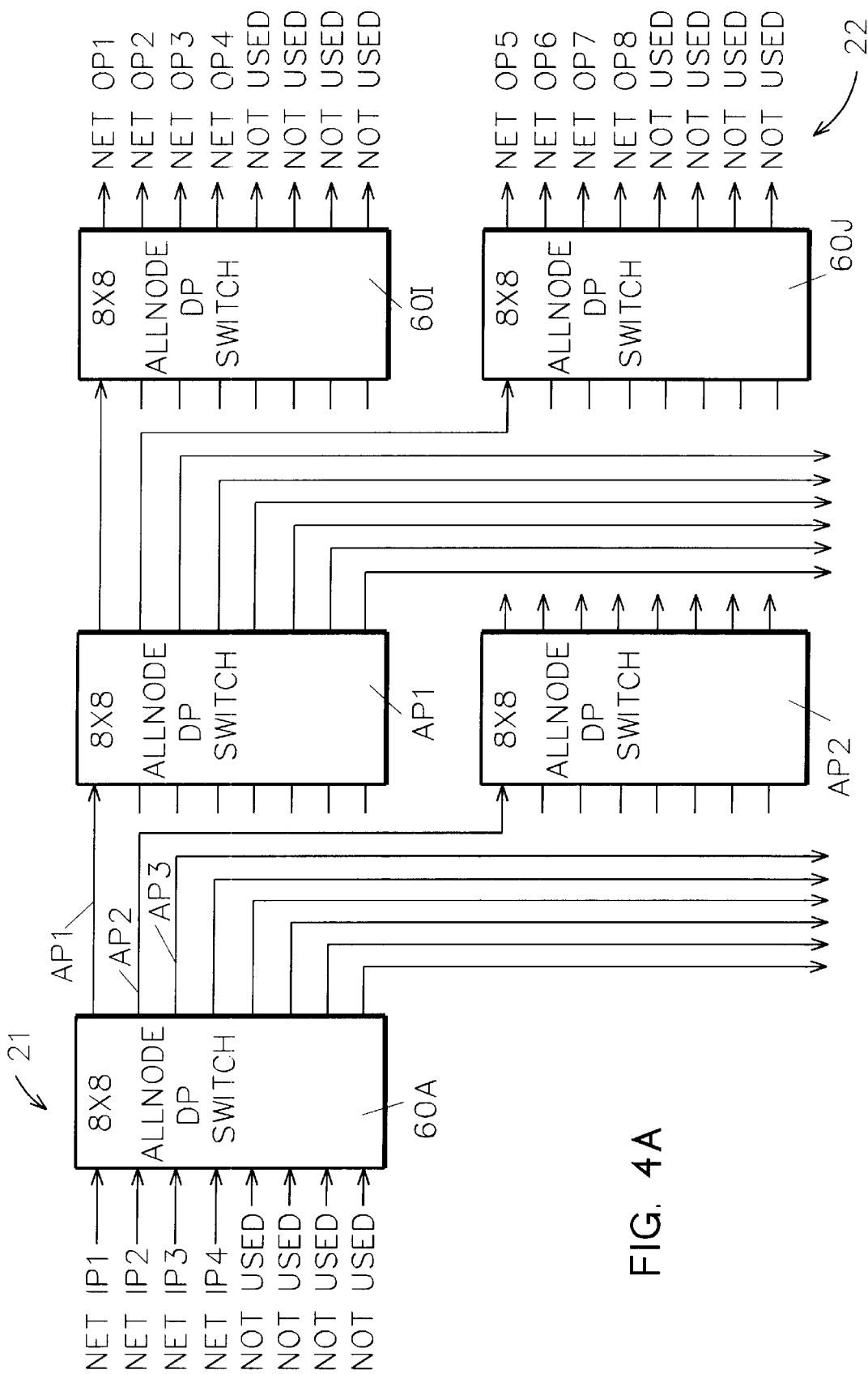
Figure 4B:
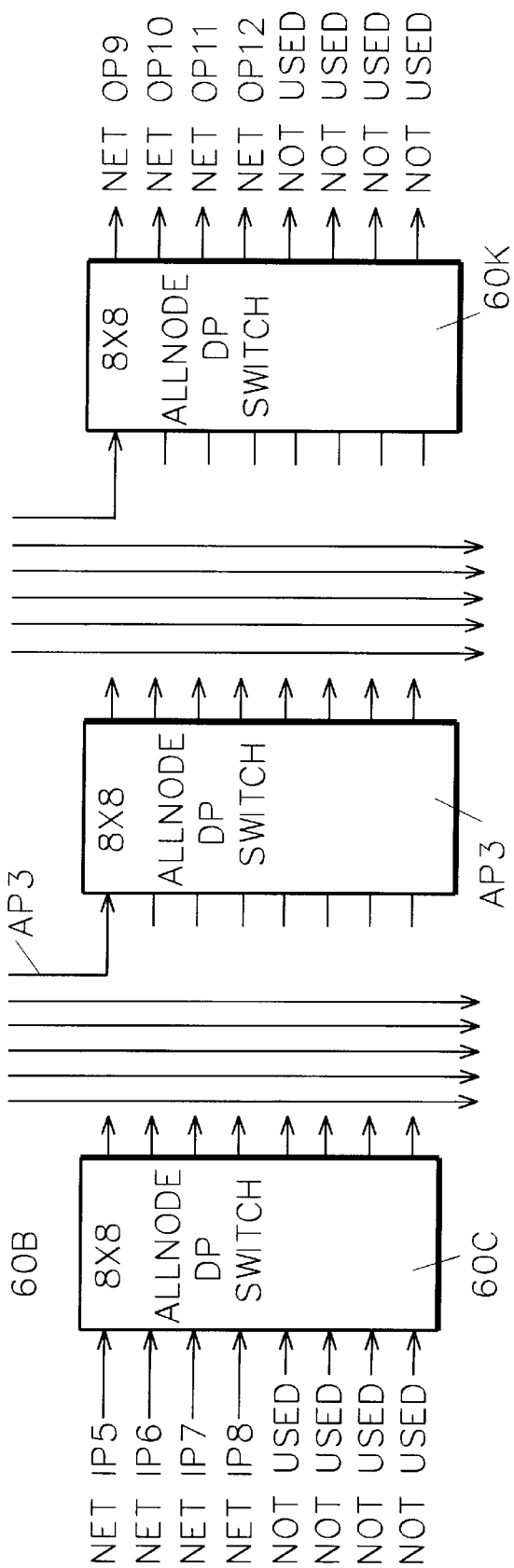
Figure 4C:
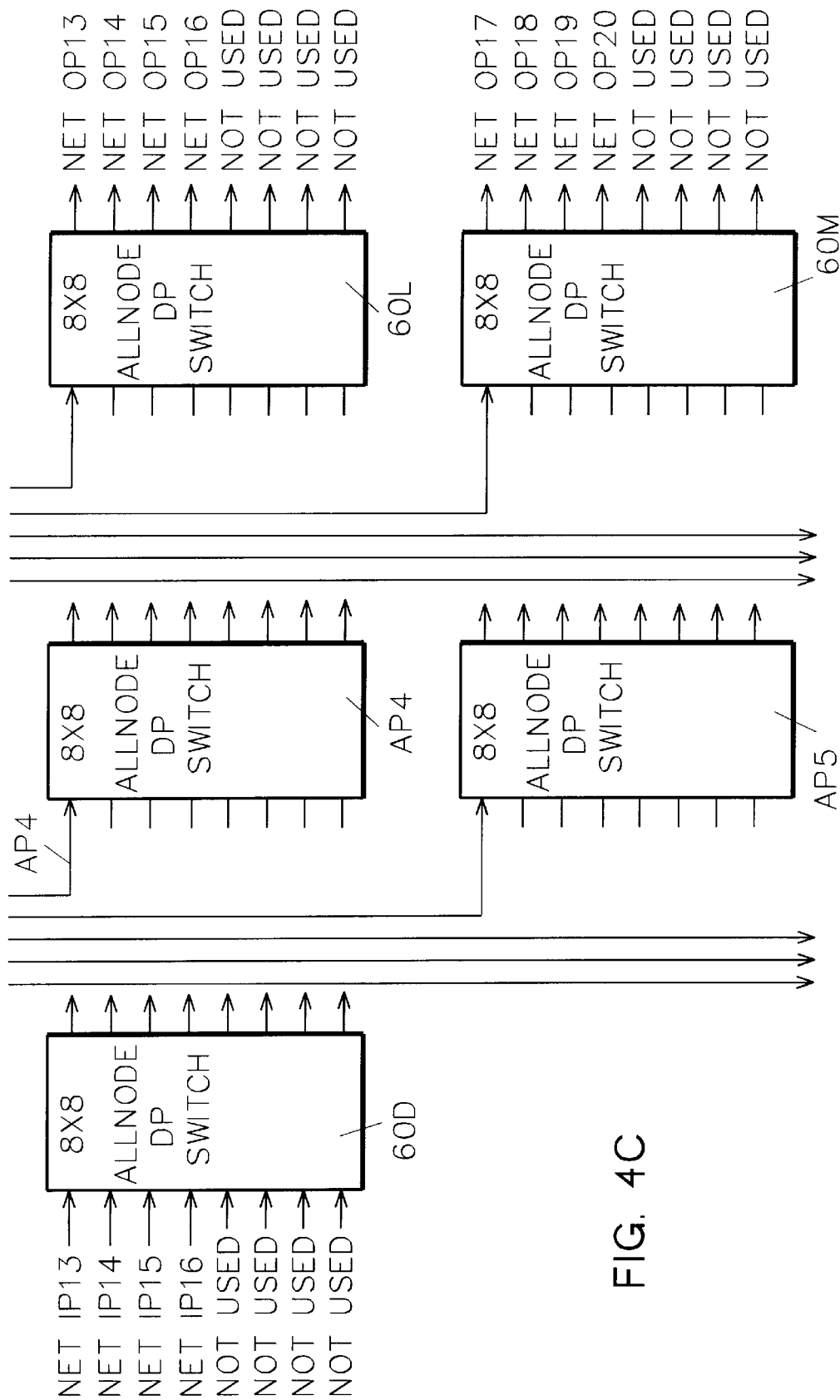
Figure 4D:
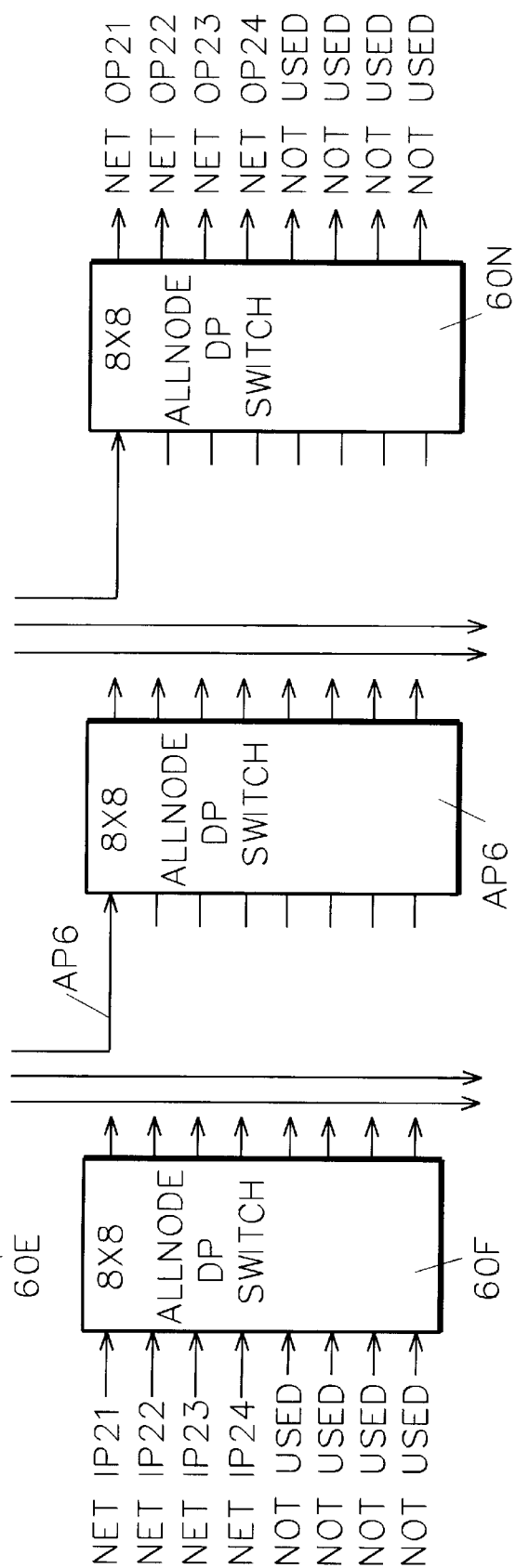
Figure 4E:
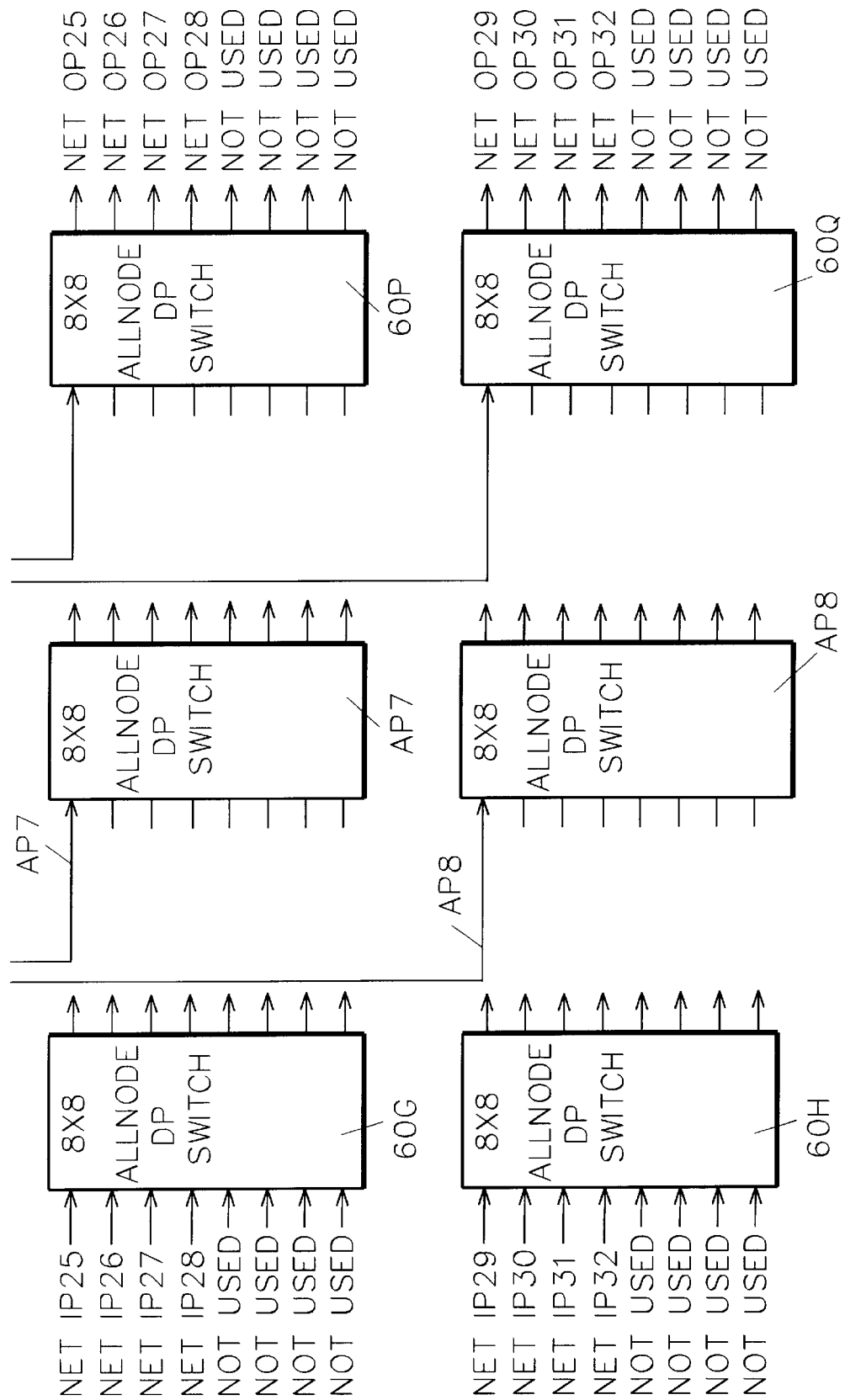

FIG. 2 shows a diagram of 4-Ported memory 18 resident in network adapter 10 and the data flow in and out of memory 18. Processor 50 sends commands in the form of a 32-bit address followed by 32-bit data words over I/O Bus 9 to network adapter 10 port 1. One of the processor commands writes messages directly to one of Send FIFOs 40, 41, 42 at a location in memory 18 selected by the 32-bit address. Another one of the processor commands reads messages directly through port 2 from one of the RCV FIFOs 44, 45, 46 as selected by the 32-bit address. Yet another processor command writes control words to tables 48. The 32-bit address word defines the operation to take place (write to which Send FIFO, read from which RCV FIFO, or write/read which tables 48). Messages for transmission to other nodes are sent from processor 50 over I/O bus 9 to a Send FIFO of adapter memory 18. Send adapter 14 reads the message from the addressed Send FIFO 40, 41, or 42 through port 3 and transmits it over network 20.

Network adapter 10 is a store-and-forward adapter supporting both send and receive operations to/from network 20. When receiving messages from network 20 into network adapter 10, the messages are recovered and routed by RCV adapter 12 through port 4 to one of RCV FIFOs 44, 45, 46 as specified in the header of the message. The received message is temporarily stored in the specified RCV FIFO 44, 45 or 46 until a slave operation is initiated at network adapter 10 to read the message over processor I/O Bus 9 to processor 50.

The preferred embodiment of switch network 20 is a multi-stage interconnection network comprised of Allnode switches at each stage of the network. The dual priority version of the Allnode switch (U.S. Pat. No. 5,444,705, "Dual Priority Switching Apparatus for Simplex Networks") describes the basic switch for this embodiment of the invention. This preferred embodiment of the invention is an improvement upon the basic Allnode dual priority switch of U.S. Pat. No. 5,444,705.

The Allnode dual priority switch of U.S. Pat. No. 5,444,705 operates in two basic modes: 1) normal or low priority mode, and 2) camp-on or high priority mode. The difference between the two modes relates mainly to how blockage or contention is handled when encountered in network 20. In normal mode blockage or contention, when trying to establish a path through the network, results in the switch rejecting the connection and destroying any partial connection path established in the network prior to the blockage. In camp-on mode the connection command is not rejected, but is held pending until the blockage or contention ends. When the connection is made, message transfer continues. The transfer of the message is delayed by the blockage or contention. Any partial connection path established in the network is not destroyed, but maintained throughout the delay period.

FIGS. 3A through 3D show the interface signals to the Allnode dual priority switch 60 for an 8×8 (eight input ports and eight output ports) version of the switch. The present invention renames the HI-PRI (high priority) interface signal to CAMPON. No function is changed, but CAMPON is a better functional description of the signal than HI-PRI, since the activation of the signal commands the switch to use the camp-on mode of operation.

In camp-on mode if a connection is commanded to be made to a busy output port of a dual priority switch, blockage is detected and the connection command is held pending (camped-on) until the blockage ends. When the desired output port becomes NOT busy, the camped-on connection is made and the message sequence continues.

The set of lines 61, 62, 63, 64, 65, 66, 67, 68 at each input port 21 to the dual priority switch 60 are identical in number and function to each other and to the set of lines 71, 72, 73, 74, 75, 76, 77, 78 at each output port 22. The sets of interface lines to each input and output port contain twelve unique signals: eight digital data lines (DATA 1, DATA 2, . . . , DATA 8), and 4 digital control lines (CAMPON, VALID, REJECT, and ACCEPT). The signals at each port are differentiated by a prefix of INX- or OUTX- indicating the direction and number of the port (X) that they are associated with. The eight digital data plus the CAMPON and VALID control lines have a signal flow in the direction going from input port to output port across switch 60, while the REJECT and ACCEPT control lines have a signal flow in the opposite direction.

Each unidirectional switch interface set 61, 62, 63, 64, 65, 66, 67, 68 requires only 12 signals, as shown in FIG. 3, to transmit data through the network 20—the data transfer width is byte-wide (8 bits) at a time. The signals required are:

DATA: eight parallel signals (DATA 1, DATA 2, . . . , DATA 8) used to transmit switch connection requests and to transmit data messages.

VALID: When active, indicates that a data message plus its routing prefix is in the process of being transmitted. When inactive, it indicates a RESET command and causes the corresponding switch input port 21 of switch 60 to break all connections and to reset to the IDLE state.

CAMPON: When active, indicates the message in process is in the camp-on mode. If blockage in the network or contention for the destination node is encountered, the connection request will remain pending and connections established in previous stages of the network remain active. When CAMPON is inactive, it indicates that the message in process is in normal mode and when blockage or contention is encountered connections established in previous stages of the network are broken immediately.

REJECT: Signal flow is in the opposite direction from the DATA and VALID signals. When REJECT is active, it indicates that blockage or contention has been detected in normal mode, or an error condition has been detected in either normal or camp-on mode.

ACCEPT: Signal flow is in the same direction as the REJECT signal. When ACCEPT is active during the transfer of the data message, it indicates that a message is in the process of being received and checked for accuracy. When ACCEPT goes inactive after the transfer of the data message, it indicates the message has been received correctly. When ACCEPT is active during the establishment of a connection in camp-on mode, it indicates that the connection is being held pending. During the establishment of a connection in normal mode, ACCEPT has no meaning. When ACCEPT goes inactive after holding a camp-on connection pending, it indicates that the blockage or contention has ended and the requested connection has been established.

Referring to FIG. 4, the preferred embodiment for interconnecting 32 parallel nodes via a non-blocking, multistage, network 20 using 8×8 dual priority switching elements 60A through 60H, AP1 through AP8, and 60I through 60Q is shown. These Allnode dual priority switches are arranged in 3 columns, where each column is a stage of network 20. The first stage contains switches 60A to 60H and provides 64 input ports 21 to network 20; however, half of the 64 input ports are not used. The second stage of switches are labeled AP1 to AP8 and provide eight alternate paths between any two nodes. The third stage of switches are labeled 60I to 60Q and provide 64 output ports 22 from network 20; however, half of these 64 output ports are not used.

Using only 32 of the 64 input and output ports makes the network of FIG. 4 non-blocking. It is possible to use all 64 input ports and all 64 output ports to create a good network for interconnecting 64 parallel nodes, but the network would not be non-blocking. The network would still support eight alternate paths between any two nodes, but fifteen alternate paths would be required to make the network of 64 nodes non-blocking. The reasons why networks are blocking vs. non-blocking and the number of alternate paths required to make a network non-blocking are explained in U.S. patent application Ser. No. 08/762,763, filed Dec. 10, 1996 (assignee docket EN995041), "TWO-TAILED ADAPTER FOR SCALABLE, NON-BLOCKING NETWORKS" by Olnowich. However, the blocking vs. non-blocking characteristics of networks are not directly pertinent to the present invention, and need no further explanation here.

Figure 5B:
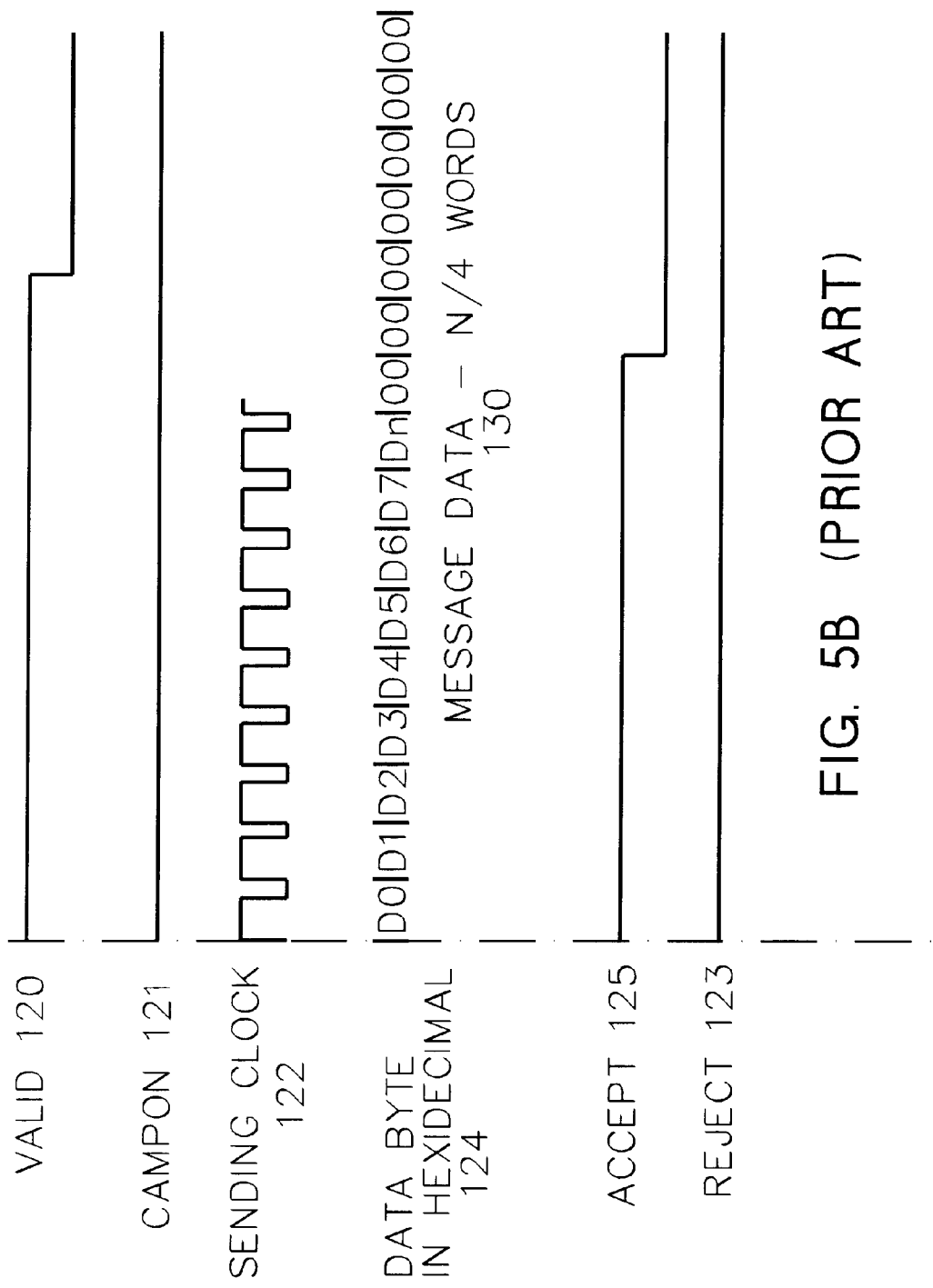

FIGS. 5A and 5B show the timing for a message sent over the Allnode switch network 20. Busses 23 and 24 include the following lines: VALID 120, CAMPON 121, Data bus 124, ACCEPT 125 and REJECT 123. Send adapter 14 transmits on data line 124 bytes of data synchronized to the rate of the sending clock 122 (the clock rate is 100 MHZ for the preferred embodiment). When send adapter 14 is not transmitting a message, it sends all zeroes data bytes (00h —where h means in hexadecimal notation) and deactivates its VALID signal 120 to 0. Sending clock 122 internal to send adapter 14 is always oscillating, but no message is sent to network 20. Neither does send adapter 14 use any bandwidth from adapter memory 18, when send adapter 14 is not transmitting a message. Send adapter 14 sends only the byte-wide data 124 plus the VALID 120 and CAMPON 121 signals to network 20. Send adapter 14 does not send a clock to network 20, neither does any node 30 connected to the network. The switch generates it own asynchronous 100 MHZ clock. Sending adapter 14 receives two control signals (REJECT 123 and ACCEPT 125) from network 20 to help it track the progress of a message being transmitted to network 20.

In the normal mode send adapter 14 begins transmitting a message to network 20 by activating the VALID signal 120 to 1, while sending null (00h) data bytes. After several clock times elapse, send adapter 14 sends routing bytes 126 (R1, R2, R3) to select a connection path through the network of FIGS. 3A through 3D to the desired destination. One routing byte selects one of 8 routing options at each stage of the network. A network having N stages requires N routing bytes. A null (00h) byte is sent after every routing byte 126. The null byte immediately following each routing byte 126 is called a dead field and provides time for the switch to resolve any contention problems. After the routing bytes, send adapter 14 transmits one or several additional 00h bytes and begins to transmit the message by first sending one SYNC byte 127 to start the message, followed by the message 128, 130. One data byte 128, 130 is sent every clock 122 time as shown in FIG. 5. Four byte message header word 128 (H1 to H4) is sent immediately after the SYNC byte.

Figure 6:
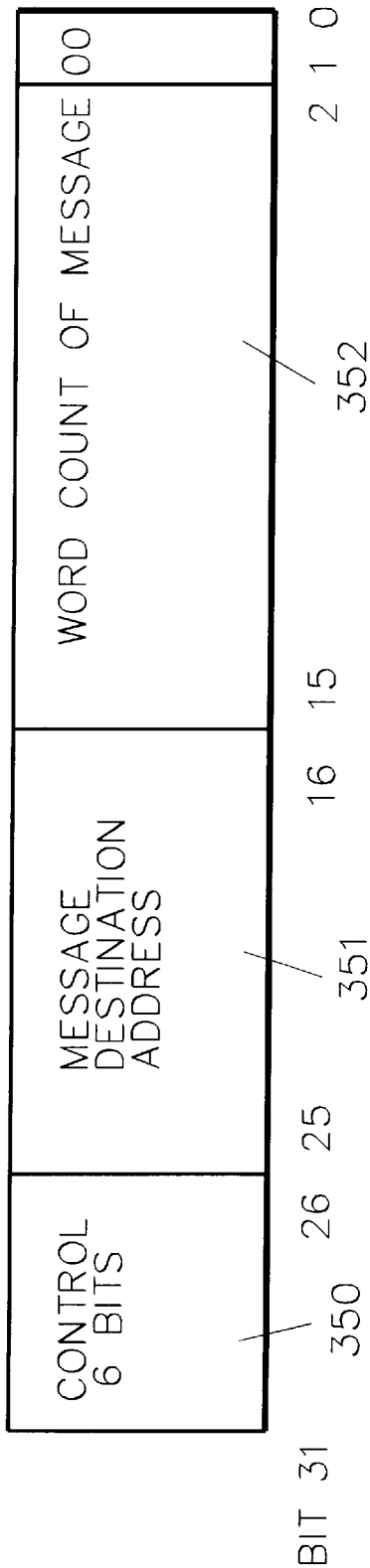
FIG. 6 is a diagram of the showing the message header transmitted across the network according to the preferred embodiment of this invention.

Referring to FIG. 6, header word 128 includes destination field 351, control field 350, and word count field 352.

Referring, again, to FIG. 5, immediately after header 128, message data bytes 130 (D0 to Dn) follow, where n indicates that the message can be of variable length. After Dn is transmitted to complete the sending of valid data bytes, 00h bytes are sent and VALID signal 120 stays active waiting to see if the message is accepted or rejected. FIG. 5 shows the message being accepted by ACCEPT 125 returning to 0 and REJECT 123 never going active. After ACCEPT 125 goes to 0, VALID 120 goes to 0 to indicate the completion of the message. The connection path through network 20 is broken by VALID going to 0.

As previously noted, it is an object of the invention to better handle contention problems. This is done by incorporating intelligence in the switches at the last stage of network 20 and in send adapter 14 to better handle the contention problem. The first and middle stages of the network are not a problem as they provide alternate paths for the purpose of by-passing blockage. Send adapter 14 searches the alternate paths as shown in FIG. 4 for a free path through the network, as is done in the prior art. The present invention provides a new way that deals efficiently with contention in the last stage of the network.

Referring to FIG. 7, the last stage of network 20 is issued a selective camp-on sequence for every connection attempted through the multi-stage network. FIG. 7 shows the modifications introduced by the invention to the prior art timing sequence shown in FIG. 5. In the prior art send adapter 14 has intelligence to know how many stages are in network 20; this is required so that the send adapter knows how many network routing bytes 126 to transmit to the network for the purpose of establishing a connection path through network 20—one routing byte 126 is required for each network stage. The present invention uses the same network routing bytes 126 (R1, R2, R3) as FIG. 5. However, additional intelligence is required in send adapter 14 to send a selective camp-on command 121 to the last stage of network 20, whose routing is controlled by routing byte R3 (in this three stage embodiment). The selective camp-on command is issued by send adapter 14 activating the CAMPON signal 121 to the switch interface during the routing byte R3 time as shown by the selective camp-on pulse 131 of FIG. 7. Send adapter 14 controls selective camp-on pulse 131 by knowing when it is going to transmit routing 126 byte R3, and just previous to transmitting R3 issuing the selective camp-on pulse 131 on the Campon 121 interface signal. Send adapter 14 holds selective camp-on 131 active until Accept 125 goes to 1 and then returns to 0 as shown by pulse 132. Accept 125 going to 1 indicates that the switch has recognized the camp-on command and that the connection request is being held pending. When Accept 125 goes to 0 (pulse 132 ends), it indicates to send adapter 14 that the requested connection has been made and that the message is to continue. Send adapter 14 delays the data message 128, 130 and sends null bytes (00h) as fillers until it is told to proceed by ACCEPT pulse 132 going to 0.

The purpose of selective camp-on pulse 131 is to deal with contention at the last stage. If contention exists (i.e., if output port 22 of the last stage switch is previously connected to a different input port of the last stage switch and is busy), send adapter 14 has no further need to try other alternate paths through network 20 to see if a connection can be made. An alternate connection cannot be made because the connection going from network 20 to the desired node 30 is presently busy. There are only two choices at this point: 1) camp-on the busy connection until it becomes available, or 2) postpone delivery of messages to the busy node and, if needed, try to send messages to other nodes. The present invention is capable of selecting either choice 1) or 2), instead of using the prior art of retrying the message over another alternate path. The intelligence at the last stage switches in network 20 helps send adapter 14 to make the right choice of how to handle every message. The last stage switches make an intelligent decision as to which is the best choice based, in this preferred embodiment, on the expected duration of the active connection to the busy output port.

Figure 8B:
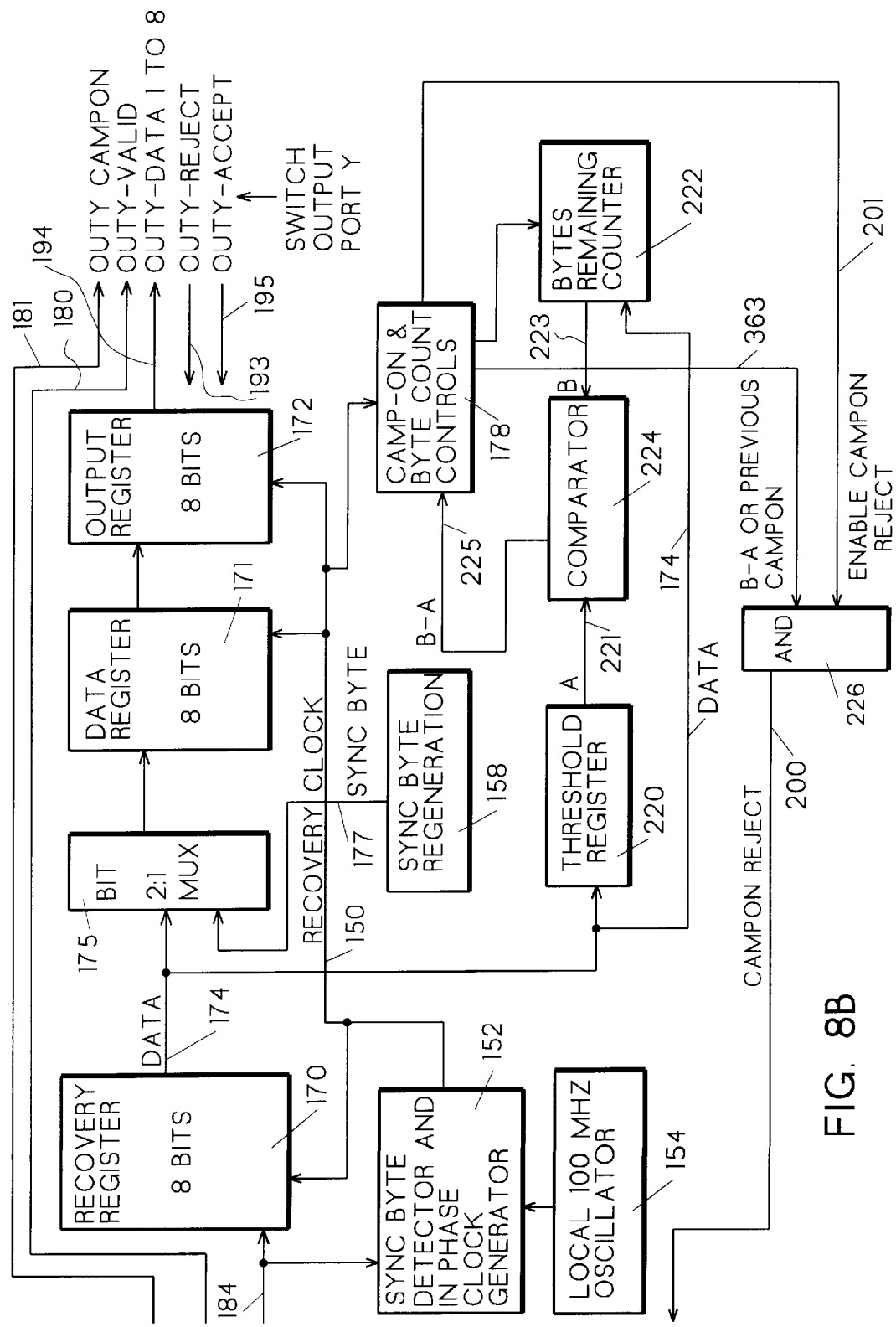

FIGS. 8A and 8B show a block diagram of the prior art switch plus the new intelligence replicated at every output port of each switch. FIG. 8 shows typically how one (X) of the eight input ports to switch 60 of FIG. 3 is connected to one (Y) of the eight output ports of switch 60 for selective camp-on. Similar to a prior art switch, switch 60 includes Routing Control 162X, Accept Control 212X, and an 8:1 multiplexer (Mux) for Output Port switch 160Y. The remainder of the logic blocks in FIG. 8 are provided for the selective camp-on as additional intelligence used to make the right choice and are not prior art.

The inputs to switch 160Y include, from each of seven other ports, signal lines Campon 121, Valid 120 and DATA 1 through DATA 8; and for this port X the following: Connect to Output Y line 163 from routing control 162X, INX-Campon line 121, INX-Valid line 120, and INX-Data 1–8 bus 124. INX-Reject line 123, INX-Accept line 125. Switch input port X also includes INX-Reject line 123 from reject control block 218X and INX-Accept line 125 from accept control 212X. INX-Valid line 120 is also fed to routing control 162X. INX-DATA 1 through INX-DATA 8 bus 124 is also fed to routing control 162X. Routing control 162X output SReject line 215 is fed to reject control block 218X along with OUTY-Reject line 192. Routing control 162X output SAccept line 213 is fed to accept control 212X, along with OUTY-Accept line 195.

Switch 160Y outputs include OUTY-Campon line 181, and OUTY-VALID line 180 to switch output port Y; and SWY-DATA 1 to SWY-DATA 8 bus 184, which is fed to recovery register 170 and sync byte detector and in-phase clock generator 152. Detector/generator 152 also receives as input the output of oscillator 154, and provides as output recovery clock signal line 150 to register 170, register 171, register 172 and camp-on and byte count controls block 178. The output of recovery register 170 is provided on bus 174 to threshold register 220; bytes remaining counter (or, remaining portion indicia) 222; and multiplexer 175 along with sync byte line 177 from sync byte regeneration block 158. The output of multiplexer 175 is fed to data register 171, the output of which is fed to output register 172. The output of register 172 is OUTY-DATA 1 through OUTY-DATA 8 bus 194 at switch output port Y. Switch output port Y also include OUTY-Reject line 193 to reject control block 218X and OUTY-Accept line 195 to accept control block 212X. The output of campon controls 178 is fed to bytes remaining counter 222, the output of which appears on line 223 at the B input to comparator 224, along with the output of threshold register 220 on line 221 at the A input. The output of comparator 224 is fed on B>A line 225 to controls 170, a second output of which is B>A or previous Campon line 363, and a third output of which is enable Campon Reject line 201. Lines 363 and 201 are fed to AND gate 226, the output of which is Campon Reject line 200.

Referring further to FIGS. 8A and 8B, in operation, assume that a path connection request has arrived at any one of the last stage switches (60I to 60Q from FIG. 4) over input port X, which can be any one of the 8 input ports (61 to 68) of switch 60. Routing Control 162X stores routing byte R3 of routing bytes 126 (FIG. 7A) and strips it from the message on bus 124, so that it is not transmitted to output port Y. Switch 60 uses routing byte R3 to select the requested output port.

In this example, routing byte R3 requests that output port Y be connected to input port X. Routing Control 162X for input port X activates 1 of 8 signals 163X to denote which 1 of the 8 output ports is requested. In the example shown in FIG. 8, Routing Control 162X activates the Connect to Output Port Y signal 163X to indicate that input port X has requested to be connected to output port Y. Every switch 60 contains eight 8:1 Multiplexers (Mux), one for each of its 8 output ports, which is shown typically for output port Y as 8:1 Mux 160Y in FIG. 8. Each of the eight inputs to Mux 160Y comes from one of the multiple 163X signals with each 163X signal being associated with one of the eight input ports (61 to 68) of switch 60. The eight Connect to Output Port Y signals 163X are mutually exclusive and control the connection established by 8:1 Mux 160Y to one and only one of the eight input ports. The Connect to Output Port Y signals are also used by Busy Controls 165Y to determine if the connection can be established or if the requested output port Y is busy.

While not otherwise pertinent to the new aspects of the present invention, logic for establishing switch input to output connections is further described in U.S. Pat. No. 5,444,705 for "Dual Priority Switching Apparatus for Simplex Networks."

The new aspects of the invention begin after logic circuitry of the prior art has established a connection from input port X of ten switch signals (Valid 120, Campon 121, and 8 DATA lines 124) to the output of Mux 160Y. The ten switch signals (Valid 180, Campon 181, and 8 DATA lines 184) are called switched signals and denoted by the names prefixed with SWY because they are switched signals, which were generated by connecting one of the 8 switch input ports (61 to 68) to the output of Mux 160Y. In the prior art the SWY-Valid 180 signal, SWY-Campon 181 signal, and the 8 SWY-Data lines 184 were the signals used directly for the output ports of switch 60. However, in the present invention these signals are further processed by new logic (i.e., intelligence) before becoming the switch output port signals: OUTY-Campon 181, OUTY-Valid 180, and OUTY-DATA 1 to 8 signals 194.

After switch 60 establishes a connection to Mux 160Y going directly (unbuffered) from input port X to the switched signals (OUTY-Valid 180 signal, OUTY-Campon 181 signal, and the 8 SWY-Data lines 184), the data message arriving at input port X (formatted as shown in FIG. 7)

passes through gate 160Y and is present immediately on the switched signals (OUTY-Valid 180 signal, OUTY-Campon 181 signal, and the 8 SWY-Data lines 184). Note that the data message in progressing from input port X to the switched signals (SWY-Valid 180 signal, SWY-Campon 181 signal, and the 8 SWY-Data lines 184) experience only one gate delay, that of gate 160Y, which is usually in the sub-nanosecond range.

As the data message appears on the switched signals (SWY-Valid 180 signal, SWY-Campon 181 signal, and the 8 SWY-Data lines 184), first several null (00h) bytes are seen, but not used. Next sync byte 127 is detected by Sync Byte Detector & In-Phase Clock Generator 152 of FIG. 8. Upon detecting the sync byte 127, block 152 generates (within a 10 ns time period) the Recovery Clock 150 signal, which is a 100 MHZ clock that is in synchronization with header 128 and data 130 in the arriving data message. The method for generating recovery clock 150 is disclosed in the prior art by U.S. Pat. No. 5,610,953 "Asynchronous Low Latency Data Recovery Apparatus and Method" by H. T. Olnowich et al. The details of the data recovery are not given herein, because knowing these details is not pertinent to the new aspects of the present invention. The importance to this invention is shown in FIG. 9, that the prior art is used to generate the waveform of recovery clock 150; i.e., recovery clock 150 is inactive until after sync byte 127 is detected and thereafter it is a 100 MHZ signal in synchronization with the data message arriving on the SWY-DATA lines 184.

Recovery clock 150 is used immediately to recover the arriving message one byte at a time. The first rise of recovery clock 150 after sync byte 127 is used to clock H0, the first byte of header word 128 into Recovery Register 170, and thus recover the H0 byte (the most significant byte of header 128). Also, recovery clock 150 stores the present state of SWY-Valid 180 signal and SWY-Campon 181 signal as well as the 8 SWY-Data lines 184 in Recovery Register 170 as shown in FIG. 8. The timing of Recovery Register 170 is shown in FIG. 9 on the horizontal line labeled "Recovery Register 170", which depicts that on every rise of recovery clock 150 the next sequential byte of the message is recovered and stored to Recovery Register 170. Note that each recovered byte only stays in Recovery Register 170 for one clock time, then it is replaced by the next sequential byte as the message progresses. On the second rise of recovery clock 150 the H0 byte moves to Data Register 171 as shown by the timing in FIG. 9 on the horizontal line labeled "Data Register 171". Note that the rise of the first pulse on Recovery Clock 150 loads sync byte 127 into Data Register 171. The sync byte 127 that is stripped off of the data going into Recovery Register 170 is regenerated and once again prefixes the message going into Data Register 170. Sync byte 127 has the value of FFh (all ones) and the Ffh value is generated by the SYNC Byte Regeneration block 158 of FIG. 8. When the first pulse occurs on Recovery Clock 150, the regenerated sync byte from block 158 is selected by 2:1 Mux 175 and sent to Data Register 171. Mux 175 selects the very first byte as clocked by the first pulse on Recovery Clock 150 to come from block 158. After the first pulse on Recovery Clock 150, all subsequent clocks on Recovery Clock 150 select the byte in Recovery Register 170 to send to Data Register 171.

Figure 9B:
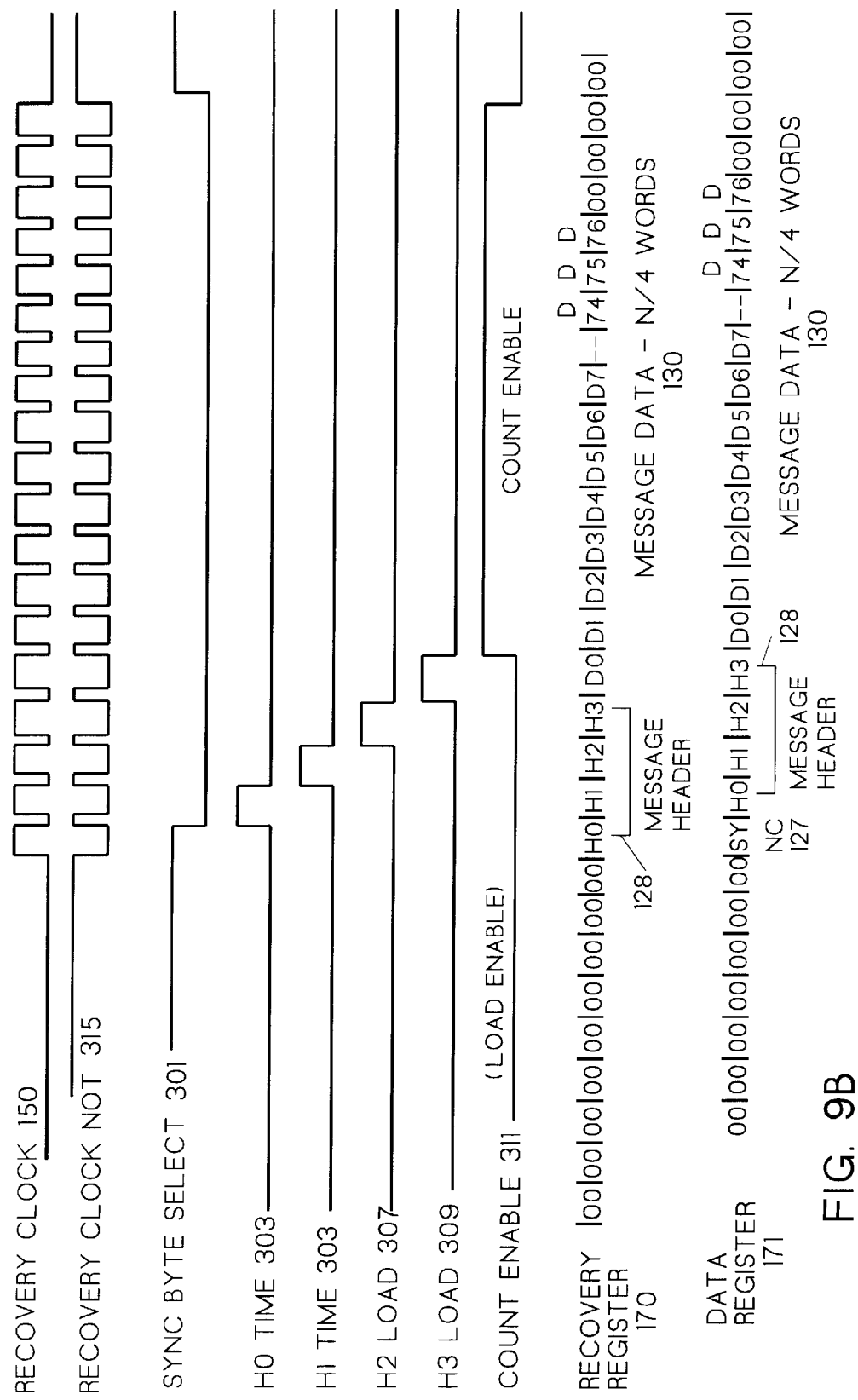
Figure 9C:
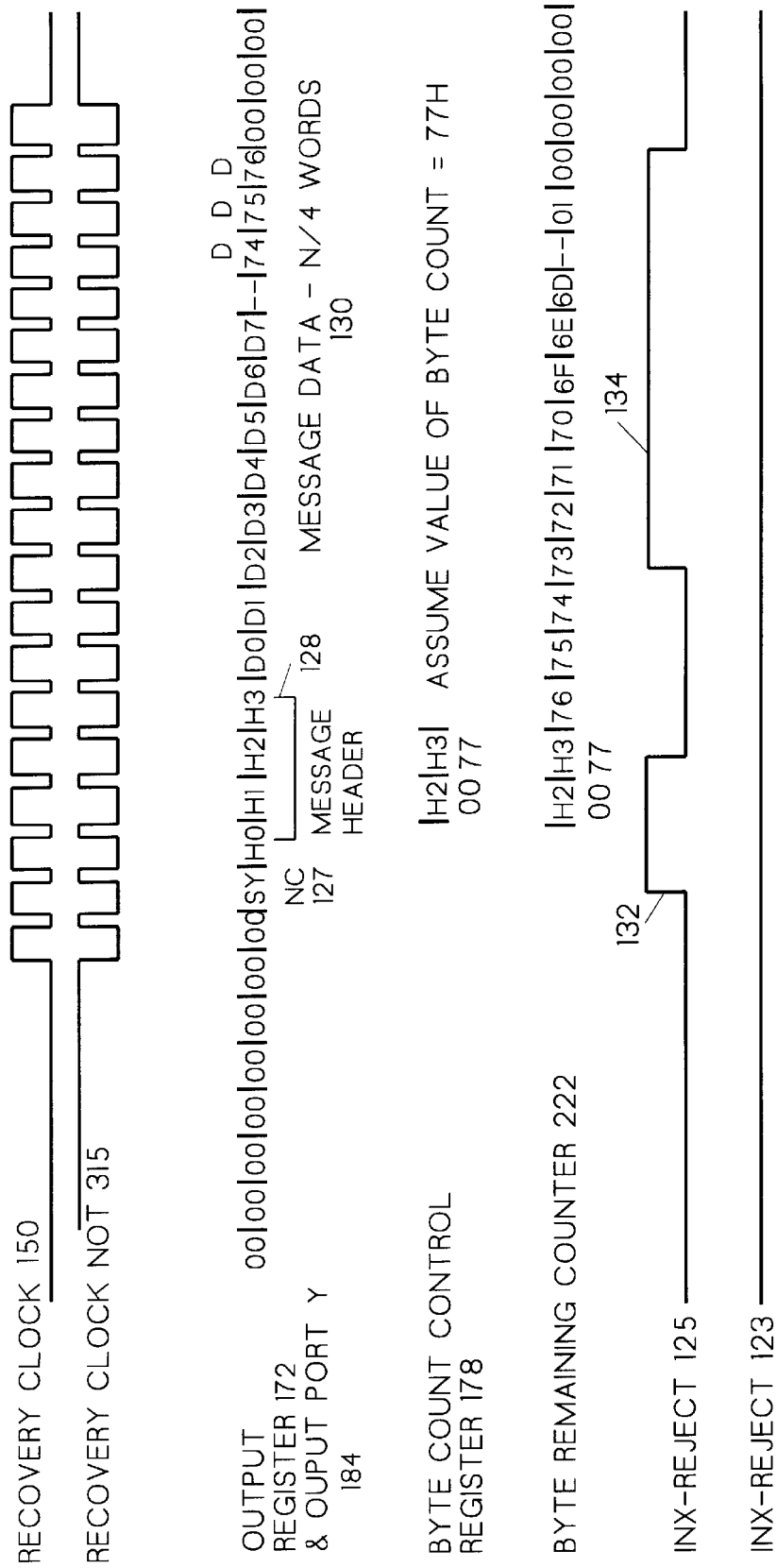

On the rise of the second pulse of Recovery Clock 150 the sync byte 127 moves from Data Register 171 to Output Register 172 and onto the OUTY-Data 1 to 8 signals 194 as shown by the timing in FIG. 9 on the horizontal line labeled "Output Register 172 & Output Port Y". Thus, the data message passes through registers 170, 171, and 172 and is output from the switch chip via the selected output port Y exactly as it entered the switch input port X, except that it has been delayed by 2 clock times (equals 20 ns) and the routing pulse (R3) 126 has been stripped off. Note that the bytes transferred in FIG. 9 on the line labeled "SWY-Data Byte 184" are the same as those transferred on the line labeled "Output Register 172 & Output Port Y", except that the bytes on "Output Register 172 & Output Port Y" are delayed about 2 byte times. The 4 control signals (OUTY-Valid 180, OUTY-Campon 181, OUTY-Reject 193, and OUTY-Accept 195) all bypass registers 170, 171, and 172 and are transferred unbuffered between input and output ports.

The purpose of delaying the message 2 byte times as it passes through from switch input port X to output port Y is twofold: 1) to allow the switch to recover the command field in header word H0 and to determine if the message is a control command for output port Y, and 2) to allow the switch to recover and snoop the byte count of data message 130 from header 128. In regards to case 1, FIG. 6 shows message header 128 to include 2 bits in the H0 byte (bits 30 and 29) which indicate commands to the switch output port Y (the output port selected by the routing). Bit 30, Enable Camp-on Reject 201, is a command to output port Y enabling it to reject camp-on message sequences if output port Y is previously camped-on or if output port Y is busy and the number of bytes remaining to be transferred is greater than the value in Threshold Register 220. Bit 29, Load Threshold Register, is a command to output port Y to load data bytes D0 and D1 of message data 130 into Threshold Register 220. This makes Threshold Register 220 programmable from processor 50.

Figure 10A:
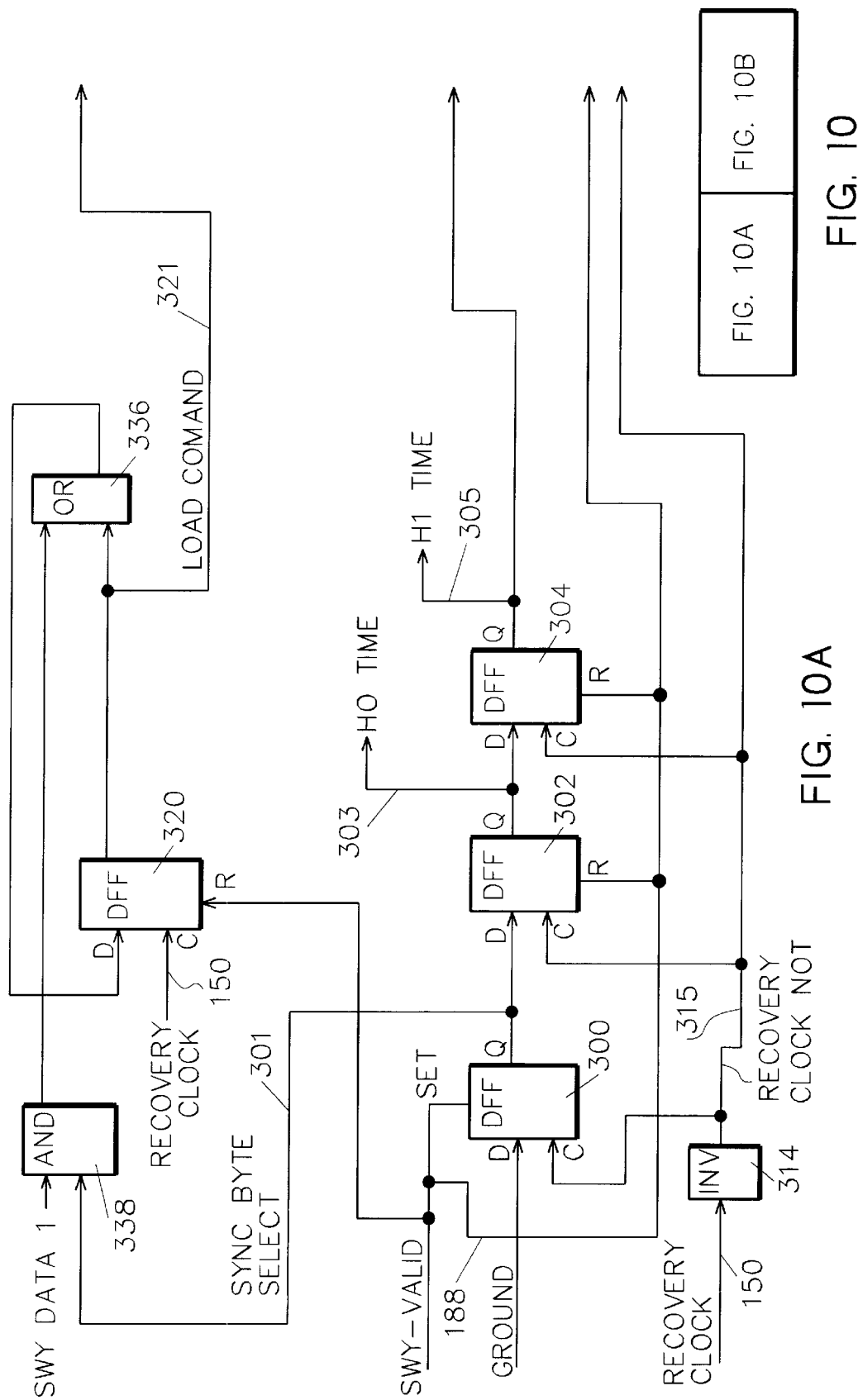
Figure 10B:
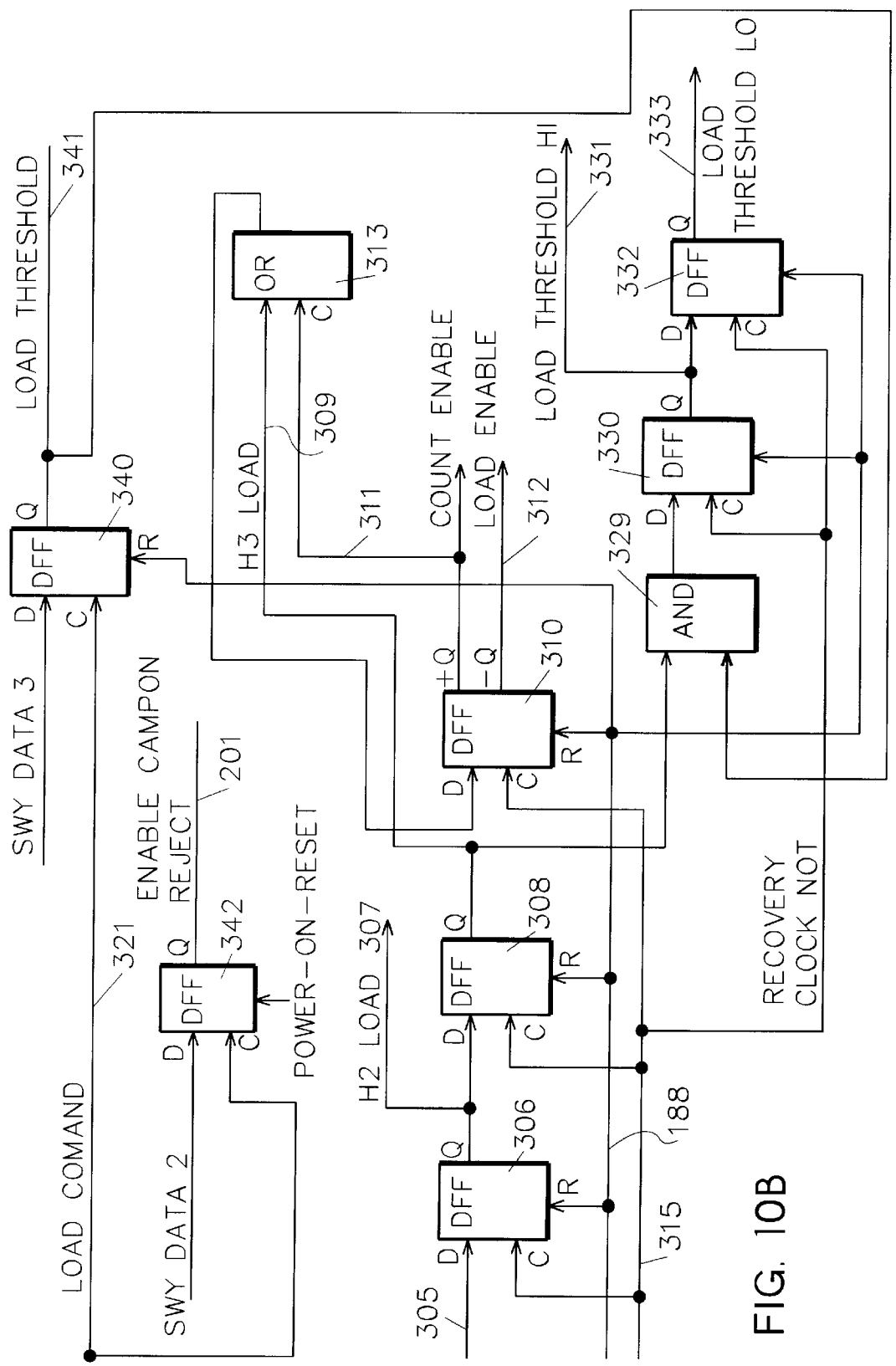
Figure 10C:
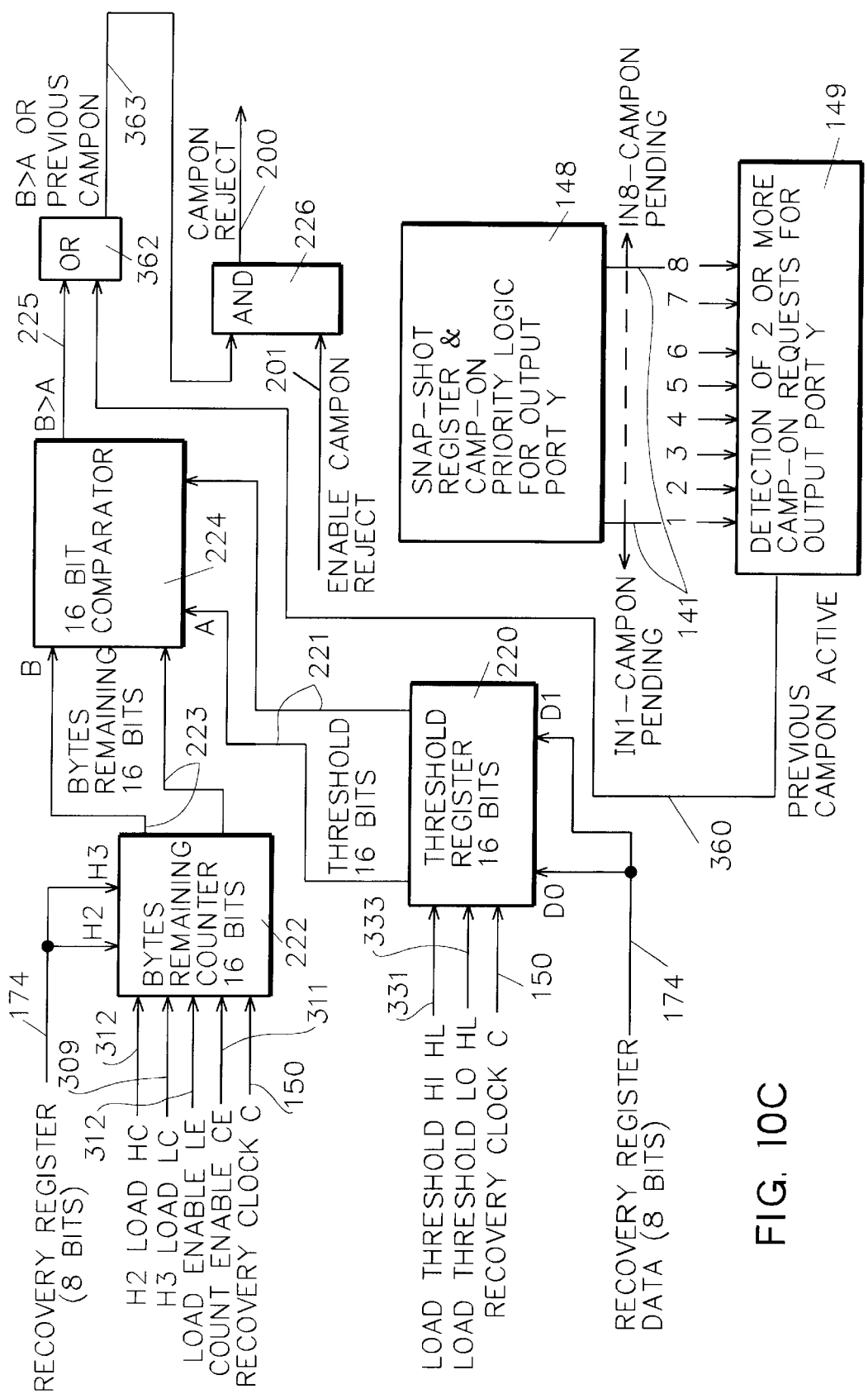

Referring to FIGS. 10A through 10C, further details of block 178 and its associated logic are set forth. These implement the command and byte count snooping at switch 60.

Referring to FIGS. 10A and 10B, SWY valid line 188 is fed to the set input on DFF block 300 and to the reset pins on DFF blocks 320, 302, 304, 306, 308, 310, 330, 332 and 348. Recovery clock line 150 is input to counter 222, register 220, the clock input of DFF block 320; and inverter 314, the output of which is fed on recovery clock not line 315 to the clock inputs of DFF blocks 302, 304, 306, 308, 310, 330, and 332. The data input to DFF 300 is tied to ground, and its output (Q) is fed on sync byte select line 301 to AND gate 338 and to the data pin on DFF 302. The output of DFF 302 is fed on H0 time line 303 to the data input of DFF 304. The output of DFF 304 is fed on H1 time line 305 to the data input of DFF 306. The output of DFF 306 is fed on H2 load line 307 to the data input of DFF 308. The output of DFF 308 is fed on H3 load line 309 to OR gate 313 and AND gate 329. The +Q output of DFF 310 is fed on count enable line 311 to counter 222 and OR gate 313, the output of which is fed back to the data input of DFF 310. The −Q output of DFF 310 is fed on load enable line 312 to counter 222.

Along with Sync byte select line 301, SW^ Data 1 is fed to AND gate 330, the output of which is fed to OR gate 336. The output of OR gate 336 is fed back to the data input of DFF 320, the output of which is fed on load command line 321 to OR gate 336, the clock inputs of DFF 348 and 342. SWY data 3 is fed to the data pin of DFF 348, the output of which is fed on load threshold line 341 to AND gate 329. SWY data 2 is fed to the data input of DFF 342, which is reset by power-on-reset, and the output of which is fed on enable campon reject line 201 to AND gate 226 (FIG. 8B.) The output of AND gate 329 is fed to the data input of DFF 330, the output of which is fed on load threshold high line 331 to threshold register 220 and the data input of DFF 332. The output of DFF 332 is fed on load threshold low line 333 to threshold register 220.

Referring to FIG. 10C, output line 174 from recovery register 170 is fed to bytes remaining counter 222 and threshold register 220. The other inputs to bytes remaining counter are H2 load line 307, H3 load line 309, load enable line 312, count enable line 311 and recovery clock line 150. The output of bytes remaining counter 222 is fed on lines 223 to comparator 224. The other inputs to threshold register 220 are load threshold high line 331, load threshold low line 333, and recovery clock 150. The output of threshold register 220 is fed on lines 221 to comparator 224. The B>A output of comparator 224 is fed on line 225 to OR gate 362 along with previous campon active line 360 from detector 149. The output of OR gate 362, representing B>A or previous campon, is fed on line 363 to AND gate 226 along with enable campon reject line 201, the output of which is campon reject signal line 200. Snap-shot register and campon priority logic for output port Y 148 outputs include IN1 through IN8 campon pending lines 141, which are fed to the inputs of detector 149.

Referring further to FIGS. 10A through 10C in connection with FIGS. 9A and 9B, in operation for the purpose of snooping the command and byte count residing in header 128, it is important for Command and Byte Count Control logic 178 to track the incoming header. This is done in a series of DFF latches 300, 302, 304, 306, 308, 310 clocked by the inverse of Recovery Clock 150 as inverted by gate 314 to generate Recovery Clock Not 315. DFF latches 300, 302, 304, 306, 308, 310 set the value of the data input D to the latch output Q at the rise of clock input C. DFF latches 300, 302, 304, 306, 308 act as a shift register with each latch activating only for the duration of one Recovery Clock Not 315 cycle (10 ns) and indicating what part of the message 128 is presently stored in Recovery Register 170 (FIG. 8B.) SWY-Valid being 0 sets DFF latch 300, resets DFF latches 302, 304, 306, 308, 310, and holds DFF latches 300, 302, 304, 306, 308, 310 in the Sync Byte 127 Select 301 state until SWY-Valid goes to 1 and Recovery Clock Not 315 goes active (logical 1.) The first rise of Recovery Clock Not 315 (the first fall of Recovery Clock 150) causes the Q output of DFF latch 300 on line 301 to go to 0, as the one shifts to DFF latch 302 to denote H0 TIME 303; i.e., the first header 128 byte H0 is in Recovery Register 170. The value of 1 is shifted through DFF latches 300, 302, 304, 306, 308, 310, shifting on the rise of each Recovery Clock Not 315 until latch 310 +Q output 311 becomes a 1. Latch 310 ends the shifting process and latch 310 stays set to 1 through the feedback of the Q output of latch 310 through OR gate 313. Latch 310 is reset to 0 when SWY-Valid 180 goes to 0. This timing is shown in FIG. 9.

Latch 310 has two meanings: 1) when reset it indicates Load Enable 312 and that Bytes Remaining Counter 222 should be loaded with the value held in Recovery Register 170. 2) When set latch 310 indicates Count Enable 311 and that the contents of Bytes Remaining Counter 222 H2 are decremented every Recovery Clock time. (Quite obviously, counting down to zero from a given number is equivalent to counting up from zero to such a number.) Thus, latch 310 controls the loading and decrementing of Bytes Remaining Counter 222. Bytes Remaining Counter 222 is loaded in 2 clock cycles while Load Enable 312 equals 1. Eight (8) bits are loaded each clock cycle to provide the 16 bits for Bytes Remaining Counter 222. The signal, H2 LOAD 307, controls the loading of the H2 byte of header 128 to the high order 8 bits of the Bytes Remaining Counter 222. The signal, H3 LOAD 309, controls the loading of the H3 byte of header 128 to the low order 8 bits of the Bytes Remaining Counter 222. The H2 Load 307 and H3 Load 309 signals come from the DFF latches 306, 308 and provide the appropriate timing to load the message byte count into the Bytes Remaining Counter 222, as clocked by Recovery Clock 150. Immediately after the message byte count is loaded into the Bytes Remaining Counter 222, Load Enable 312 goes to 0 and Count Enable 312 goes to 1 as shown in FIG. 9. This starts the Bytes Remaining Counter 222 decrementing as each new byte enters Recovery Register 170. An example of how the decrementing works is shown in FIG. 9 by assuming the byte count of the message is 00 77h. It is decremented by 1 at the rise of every Recovery Clock 150. Thus, the Bytes Remaining Counter 222 keeps track of how many bytes are left to be transferred in data message 130, as the intelligence at switch 60 snoops the byte count of all messages being transferred through any output port of the last stage switch. In summary, the switch stores the snooped byte-count and decrements the stored count as each byte is transferred.

Figure 11A:
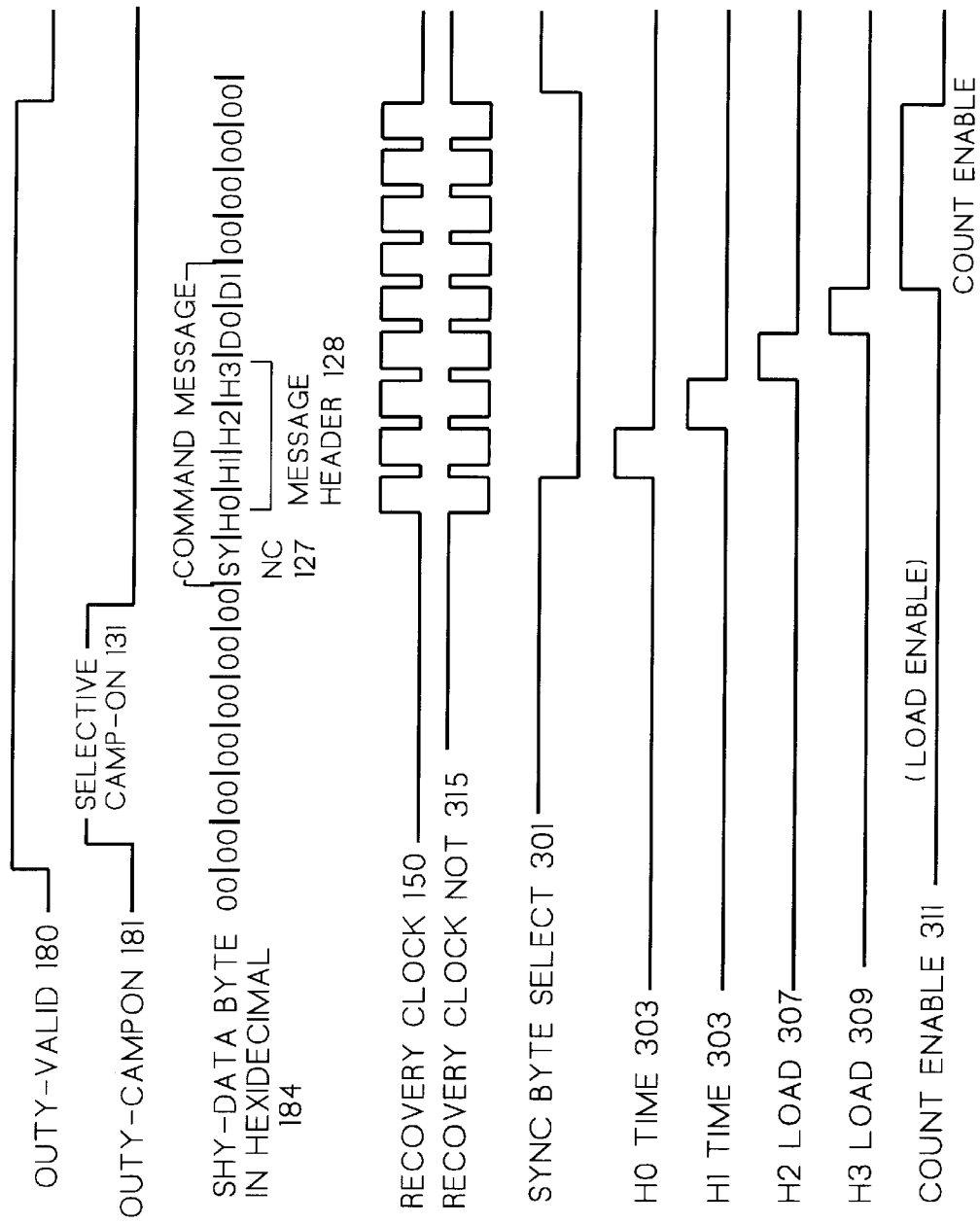
FIGS. 11A and 11B are a diagram showing the timing sequence for sending command messages having enable/disable commands and load register commands to each switch output port according to the preferred embodiment of this invention.
Figure 11B:
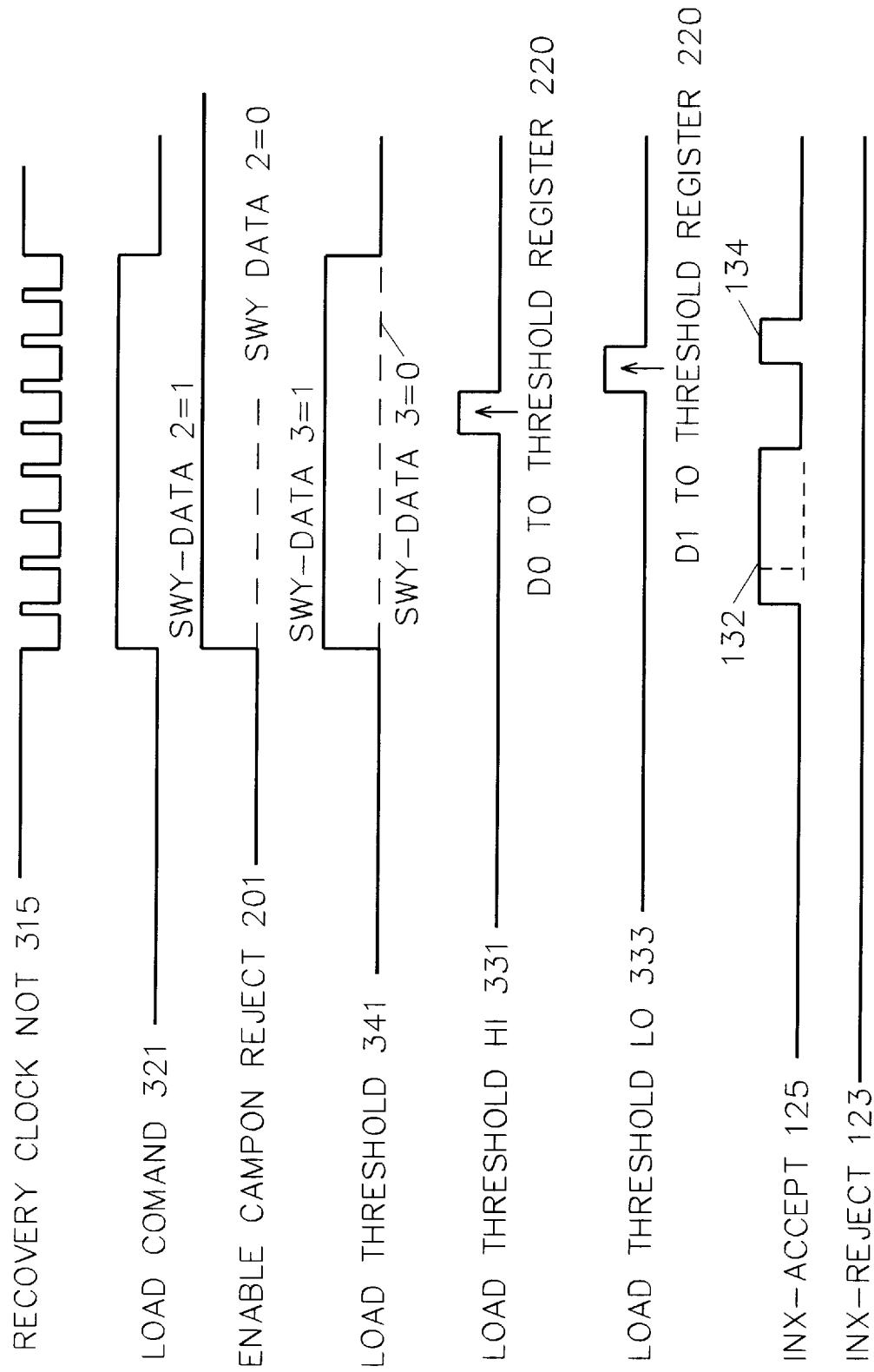
Figures 12, 12A:
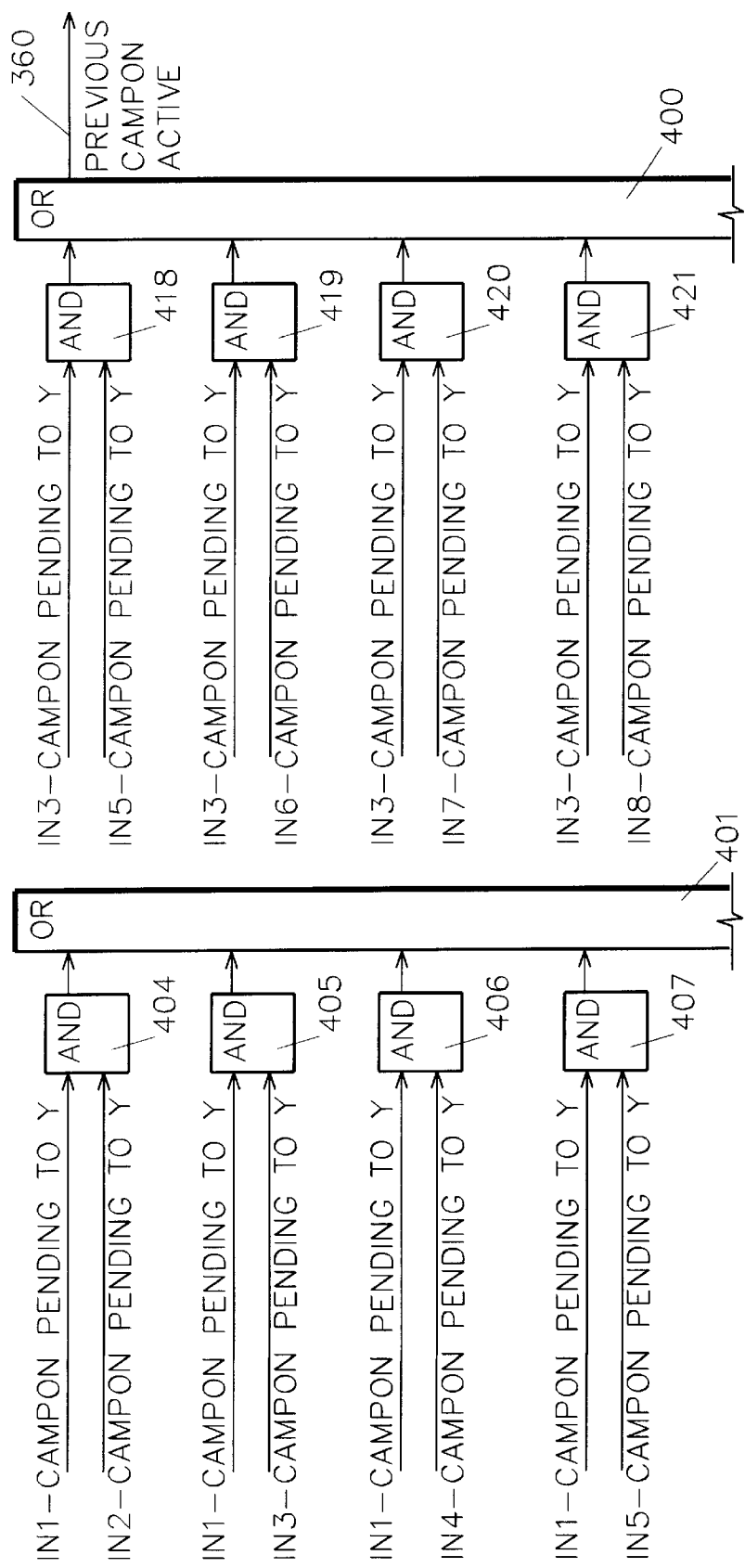
FIGS. 12, 12A through 12C are logic diagrams showing the logic used to detect two or more active camp-on requests for each switch output port according to the preferred embodiment of this invention.
Figure 12B:
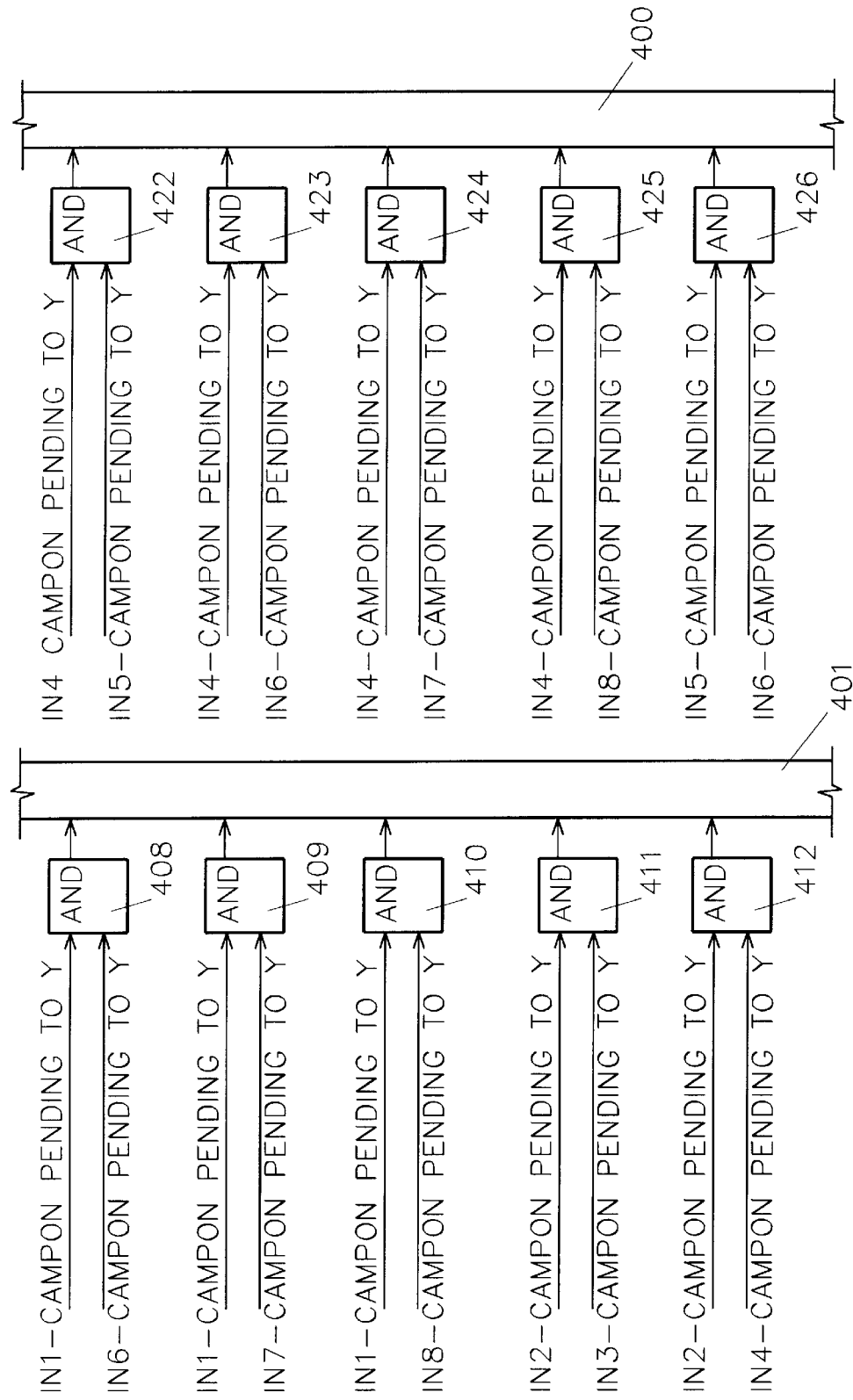
Figure 12C:
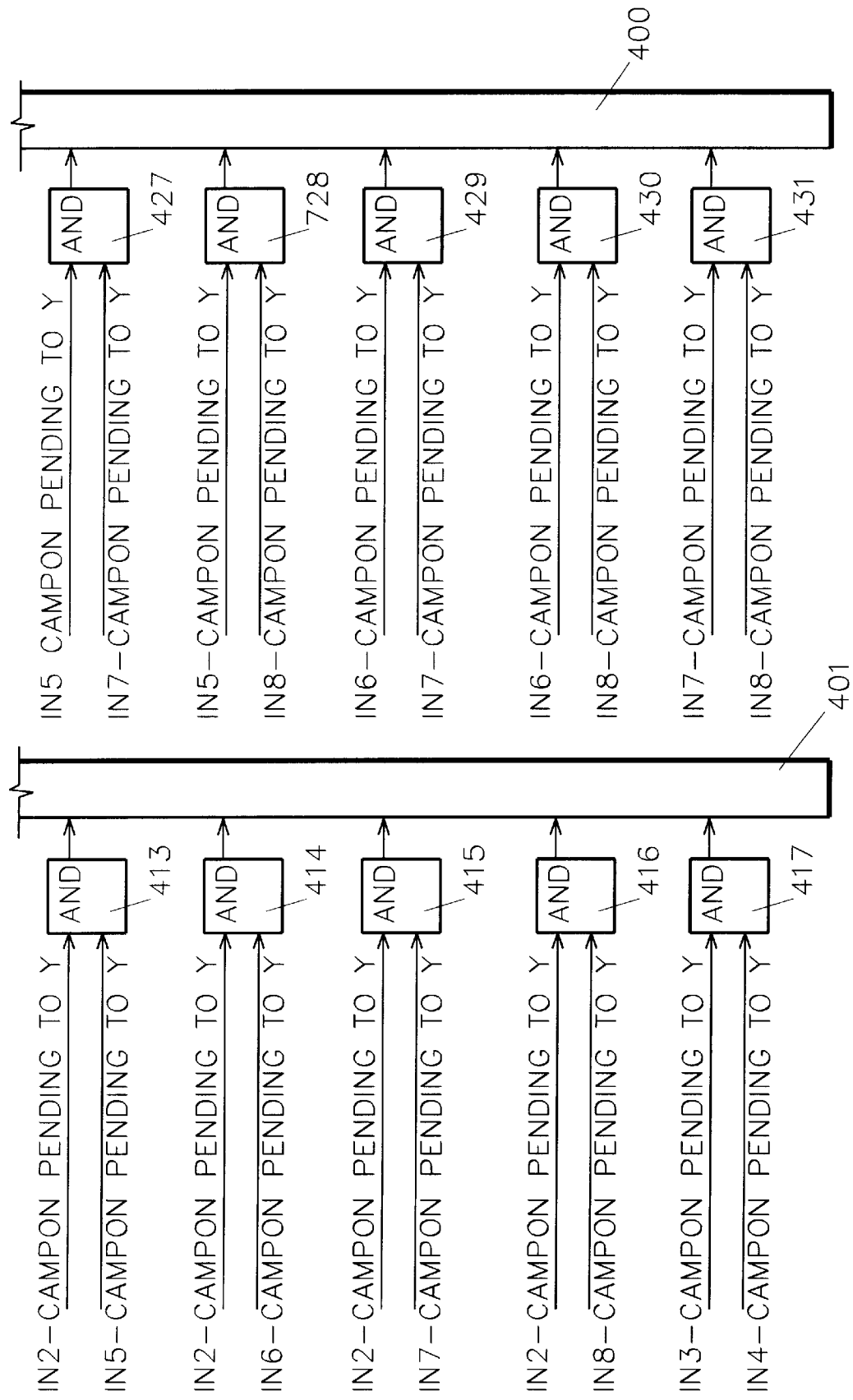

Referring further to FIGS. 10A through 10C in connection with FIGS. 11A and 11B, the other function being executed at switch 60 is the loading of command data to the switch itself. Bit 31 of Header 128 as shown in FIG. 6 (also bit 1 of the H0 byte of header 128), when equal to 0, indicates the associated message is destined for one of the nodes 30 of network 20. Bit 31 of Header 128, when equal to 1, indicates the associated message is a command message to switch 60. AND gate 338, OR gate 336, and latch 320 sense the state of bit 1 of the H0 byte of header 128 for every message. Latch 320 generates the Load Command 321 signal which was previously reset when SWY-Valid 180 was 0, and is set by AND gate 338 on the first Recovery Clock 150 rise (as indicated by SYNC Byte Select 301 signal) if bit 1 of the H0 byte of header 128 on SWY-DATA 1 is a 1 indicating a command message to the switch. OR gate 336 feeds back the Load Command 321 to latch 320 to keep latch 320 set until SWY-Valid 180 returns to 0. The timing is shown in FIGS. 11A and 11B for a command message.

The rise of the Load Command 321 signal clocks latch 342, which generates the Enable Campon Reject 201 signal. Latch 342 is set to 0 if SWY-DATA 2 is a 0, and is set 1 if SWY-DATA 2 is 1. At this time bit 30 of header 128 (bit 2 at H0 Time) is on signal SWY-DATA 2, so Enable Campon Reject 201 is loaded from bit 30 of header 128. Bit 30, Enable Camp-on Reject, is a command to output port Y enabling it to reject camp-on message sequences if output port Y is previously camped-on or if output port Y is busy and the number of bytes remaining to be transferred is greater than the value in Threshold Register 220. This function shall be described in more detail hereinafter.

The Load Command 321 signal also used to generate the Load Threshold HI 341 signal when Bit 29 of header 128 is equal to 1. Bit 29, Load Threshold Register, is a command message to output port Y to load data bytes D0 and D1 of message 130 into Threshold Register 220. Latch 340 is set if SWY-DATA 3 is 1. At this time bit 29 of header 128 (bit 3 at H0 Time) is on signal SWY-Data 3. Latch 340 generates the Load Threshold 341 signal which feeds AND gate 329 to latch 330. H3 Load 309 signal to AND gate 329 provide the appropriate timing to set latch 330 at the end of H3 time which is the beginning of D0 time. Latch 330 generates the Load Threshold HI 331 signal which is active for only 1 clock time and feeds latch 332. Latch 330 generates the Load Threshold LO 333 signal which is active for only 1 clock time, the clock right after Load Threshold HI 331 as shown in FIG. 11. Load Threshold HI 331 corresponds to message data D0 and is used to provide the appropriate time to load Threshold Register 220 with byte D0 going to the most significant (HI) 8 bits. Likewise, Load Threshold LO 333 corresponds to message data D1 and is used to provide the appropriate time to load Threshold Register 220 with byte D1 going to the least significant (LO) 8 bits. Thus, the Threshold Register 220 at each output port Y is loaded under software control to any 16-bit value.

Referring to FIGS. 8A, 8B, 10A, 10B, 10C, and 13, the control logic and timing sequence is shown for rejecting a message to output port Y, where output port Y is busy transferring a previous message and the number of bytes remaining to be transferred for the previous message is greater than the count in Threshold Register 220. The timing sequence starts with send adapter 14 activating a selective camp-on command to the last stage of network 20; i.e., Selective Camp-on 131 is issued during the selection of the last stage of the network in conjunction with routing byte (R3) 126. Switch 60 at the last stage responds first by activating the IN(x)-ACCEPT signal 125 with up-level 132 as shown in FIG. 13. Secondly, the Camp-On & Byte Count Control block 178 compares the value in Bytes Remaining Counter 222 to the value in Threshold Register 220 using Comparator 224. If the count remaining in counter 222 is above the threshold 220, comparator 224 activates the B>A signal 225—this signal maintains a constant 1 level as long as B is greater than A as shown in FIG. 13. At the time that Selective Camp-On 131 is issued, FIG. 13 shows that the B>A 225 signal is equal to 1. The B>A 225 signal goes to OR gate 362 of FIG. 10 and causes the B>A OR Previous Camp-On 363 signal to go to 1, driving AND gate 226 and the CAMPON REJECT 200 signal to 1, if the signal ENABLE CAMPON REJECT 201 is a 1.

The signal Enable Campon Reject 201 is the software programmable control generated by latch 342 of FIG. 10B and used by the software to enable the last stage switch to reject camp-on commands based on the value in the bytes remaining counter 220 compared to the value in the Threshold Register 220. For this example, it is assumed that the software has previously set the Enable Campon Reject 201 to 1, and the Campon Reject 200 goes to 1. The Campon Reject 200 signal goes to the Reject Control 218X block of FIG. 8, and causes INX-Reject signal 123 to go to a 1 as shown by pulse 133 in FIG. 13. Send adapter 14 sees the rejection of the selective camp-on command as the pulse 133 on Reject 123 makes its way backwards through network 20 to the second stage switch, the first stage switch, and finally to send adapter 14.

Send adapter 14 responds to the rejection by driving VALID 120 and CAMP-ON 121 to 0. This propagates through network 20, so that the last stage switch sees OUTY-Valid 180 and OUTY-Campon 181 go to 0 as shown in FIG. 13. The last stage switch responds to OUTY-Valid 180 and OUTY-Campon 181 going to 0 by driving INX-Accept 125 and INX-Reject 123 both to 0. This completes the camp-on reject sequence and clears the partial connection path to the last stage switch previously established in network 20. Thus, the last stage switch has indicated to send adapter 14 that it is rejecting the selective camp-on command, because the desired output port will not be available shortly. Send adapter 14, knowing that further retries at this time would be meaningless and only clog the network, is available to try a different message to a different destination, and return to retry this contended message later.

There are two possible methods that send adapter 14 can use to try a different message to a different destination, and still keep message delivery to each destination node in strict sequential order. These two methods have been disclosed in previous patent applications, and are referred to herein for information purposes only—they are not part of the present invention. 1) Implement multiple sending FIFO's in the send adapter 14, such as the three Send FIFOs 40, 41, 42 and the three RCV FIFOs 44, 45, 46 shown in FIG. 1. This concept is disclosed in U.S. patent application Ser. No. 08/734,946 filed Oct. 22, 1996 by Olnowich et al for MULTI-TASKING ADAPTER FOR PARALLEL NETWORK APPLICATIONS (assignee docket EN995116.) In this case, send adapter 14 tries a different sending FIFO after a selective camp-on command is rejected to one of the send FIFOs 40, 41, 42. If messages to the same destination are always kept in the same FIFO, the sending adapter can proceed to a different FIFO, and be sure that next it will try a message to a different destination. Eventually, based on the priority mechanism for selecting the next Send FIFO to send a message, the send adapter will return to the Send FIFO having the selective camp-on previously rejected and will try again. Preferably, there would be a programmable wait time for the next retry, to cover the case where there are no other messages to send in any Send FIFO 40, 41, 42 at this time, or the other messages are short and the Send FIFO selection mechanism returns too early for another retry of a rejected camp-on command. 2) Other mechanisms for trying messages within the same sending FIFO and yet maintaining strict order are disclosed in U.S. patent application Ser. No. 08/731,809 filed Oct. 21, 1997 (assignee docket number EN995040) by Olnowich, et al, for METHOD and APPARATUS for MAINTAINING MESSAGE ORDER in MULTI-USER FIFO STACKS. In this case, send adapter 14 moves through the same Send FIFO looking for a subsequent message to a different destination to try next. Eventually, after a time delay expires, the send adapter will return to the message receiving the rejection of the selective camp-on command and try again.

Referring to FIGS. 10A–10C, 12A–12C, and 13, there is one further case where the last stage switch 60 rejects a camp-on command. This is the case where the bytes remaining count 222 can be above or below the threshold 220, but there is another user previously camped-on to output port Y. This case is detected by blocks 148 and 149 in FIG. 10. Snap-Shot Register and Camp-On Priority Logic block 148 is not new art but was described previously in U.S. Pat. No. 5,444,705, "Dual Priority Switching Apparatus for Simplex Networks" by Olnowich et al, where it appears in FIG. 5 as block 140. Block 148 generates 8 signals on bus 141: IN1-Campon Pending to IN8-Campon Pending 148, which are used in the present invention to detect which of the 8 input ports of switch 60 are camped-on to output port Y. The 8 signals on bus 141 go to block 149, which is unique to the present invention. Block 149 is entitled "Detection of 2 or more camp-on requests for output port Y", because it looks at the 8 signals IN1 through IN8 on lines 141 and determines if any two of them are active. Block 149 is implemented using the simple combinational logic shown in FIG. 12, which just ANDs together 2 signals at a time for every combination of the 8 signals on bus 141, and ORs the AND gates 404 to 431 together to generate Previous Camp-on Active signal 360. If any 2 of the 8 signals on bus 141 are active (=1), then Previous Camp-on Active 360 will go to 1. If there is a selective camp-on presently active, it will activate one of the 8 signals IN1 through IN8 on lines 141. Therefore, if there is one or more previous camp-ons active as well, there will be at least 2 of the 8 signals 141 that will be equal to 1. As shown in FIG. 10, Previous Camp-on Active signal 360 goes to OR gate 362 where it is Ored with B>A 225 to generate B>A or Previous Camp-on signal 363. Thus, B>A or Previous Camp-on signal 363 is active for either case and generates the timing shown in FIG. 13 for either case.

Figure 14:
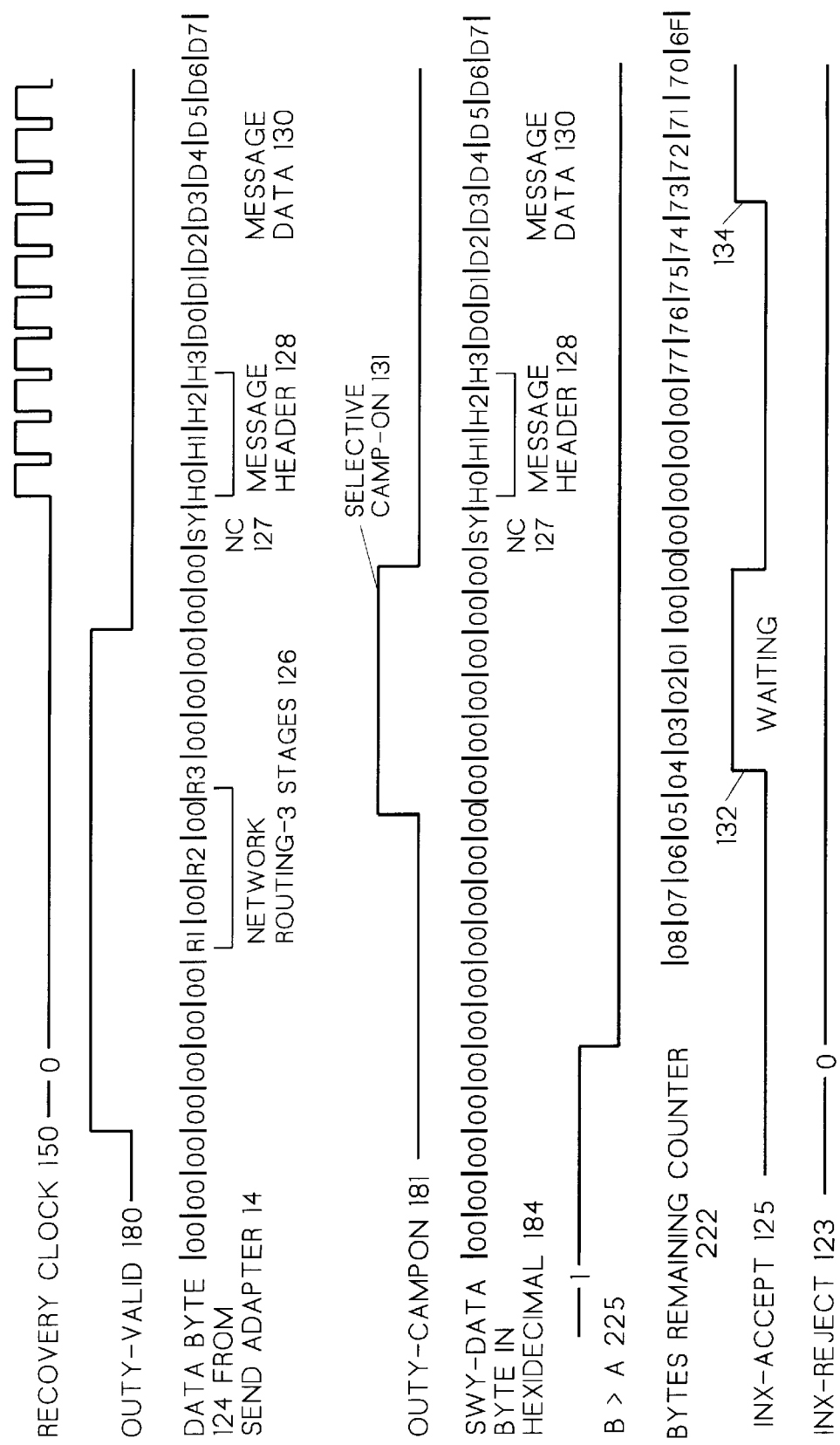
FIG. 14 is a timing diagram showing the timing sequence for accepting a message when the output port is busy transferring a previous message and the number of bytes left to be transferred for the previous message is less than the count in Threshold Register 220 according to the preferred embodiment of this invention.
Figures 15, 15A:
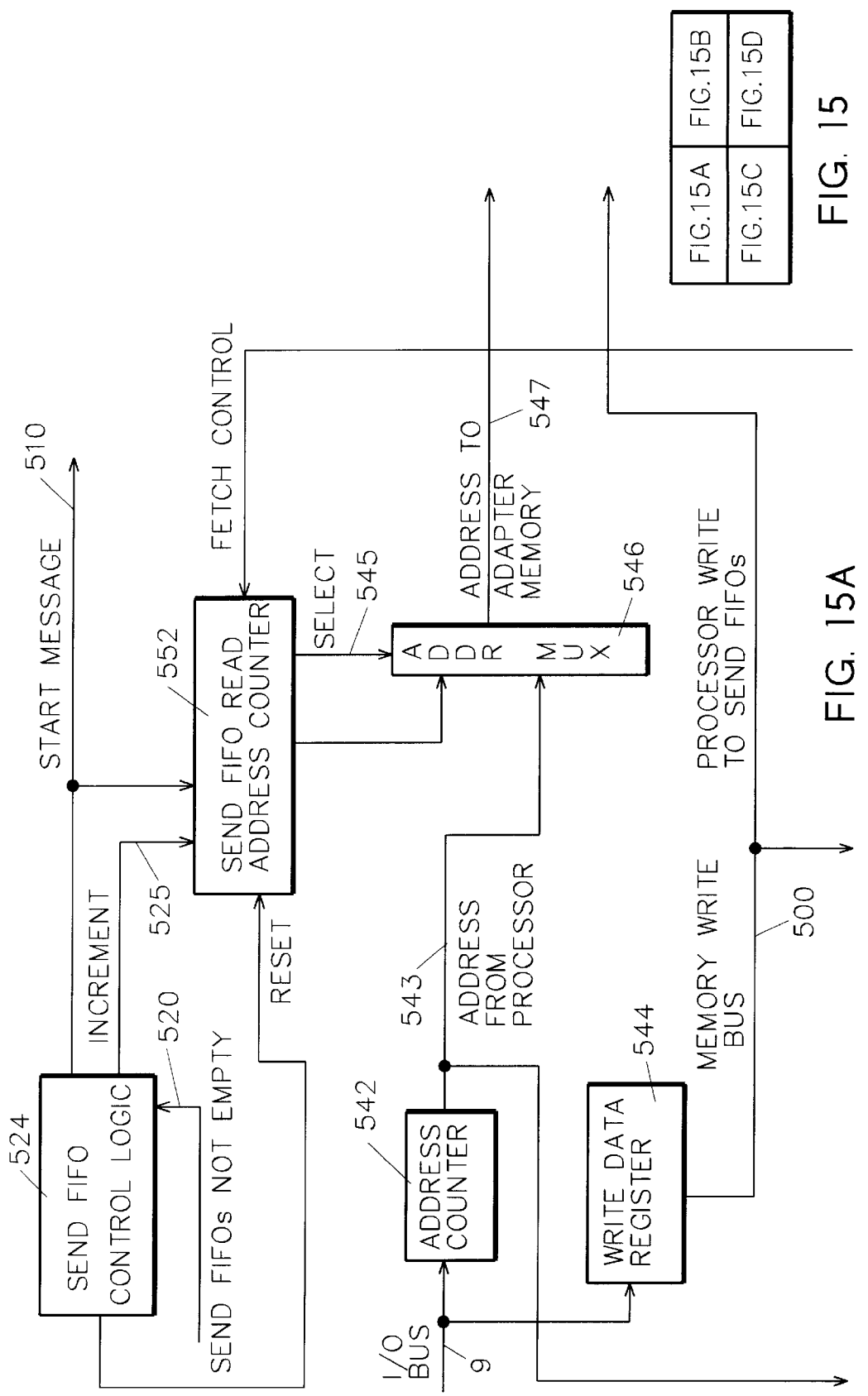
FIGS. 15, 15A through 15D are block diagrams showing the implementation at the send adapter of the selective camp-on feature and its associated options according to the preferred embodiment of this invention.
Figure 15B:
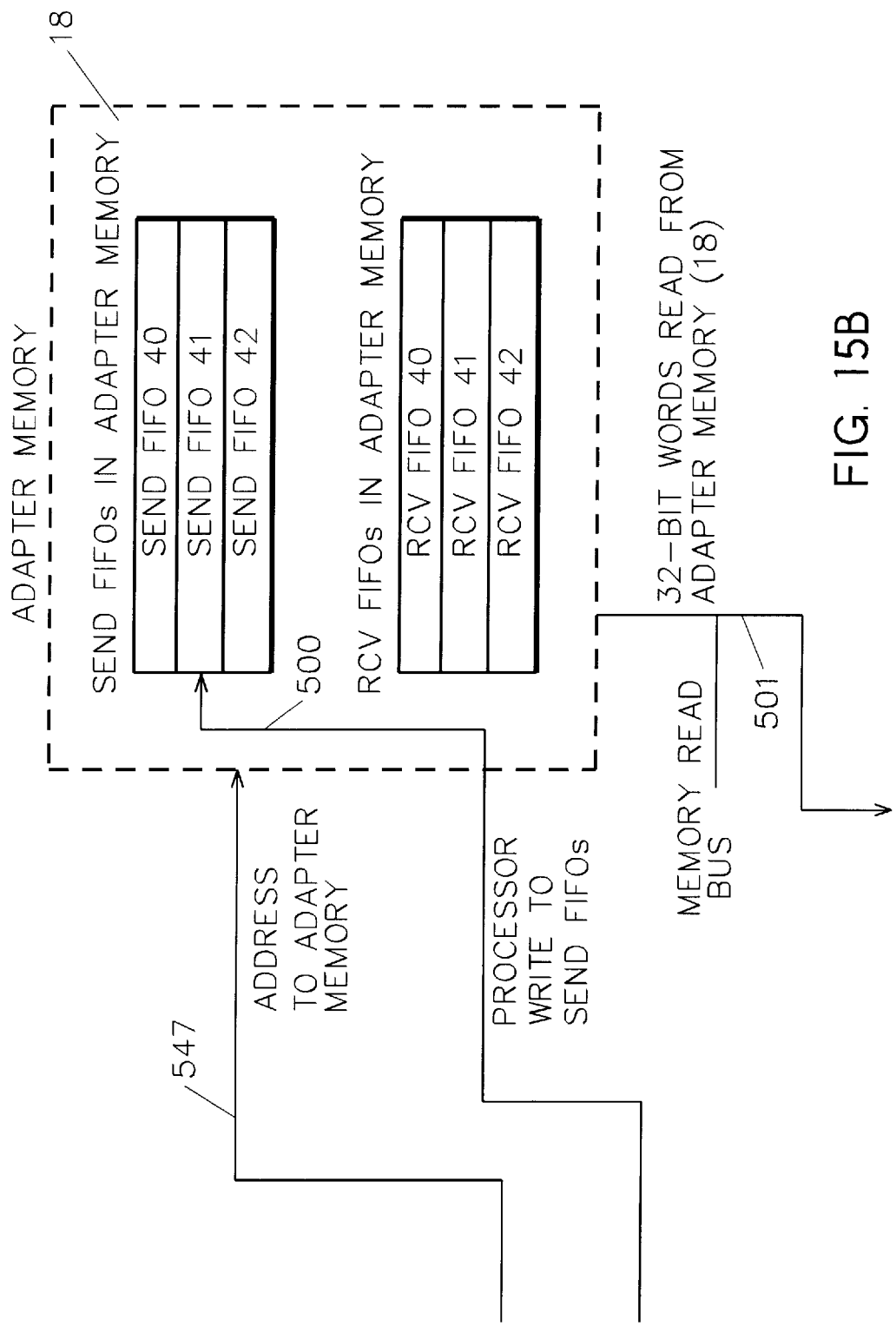
Figure 15C:
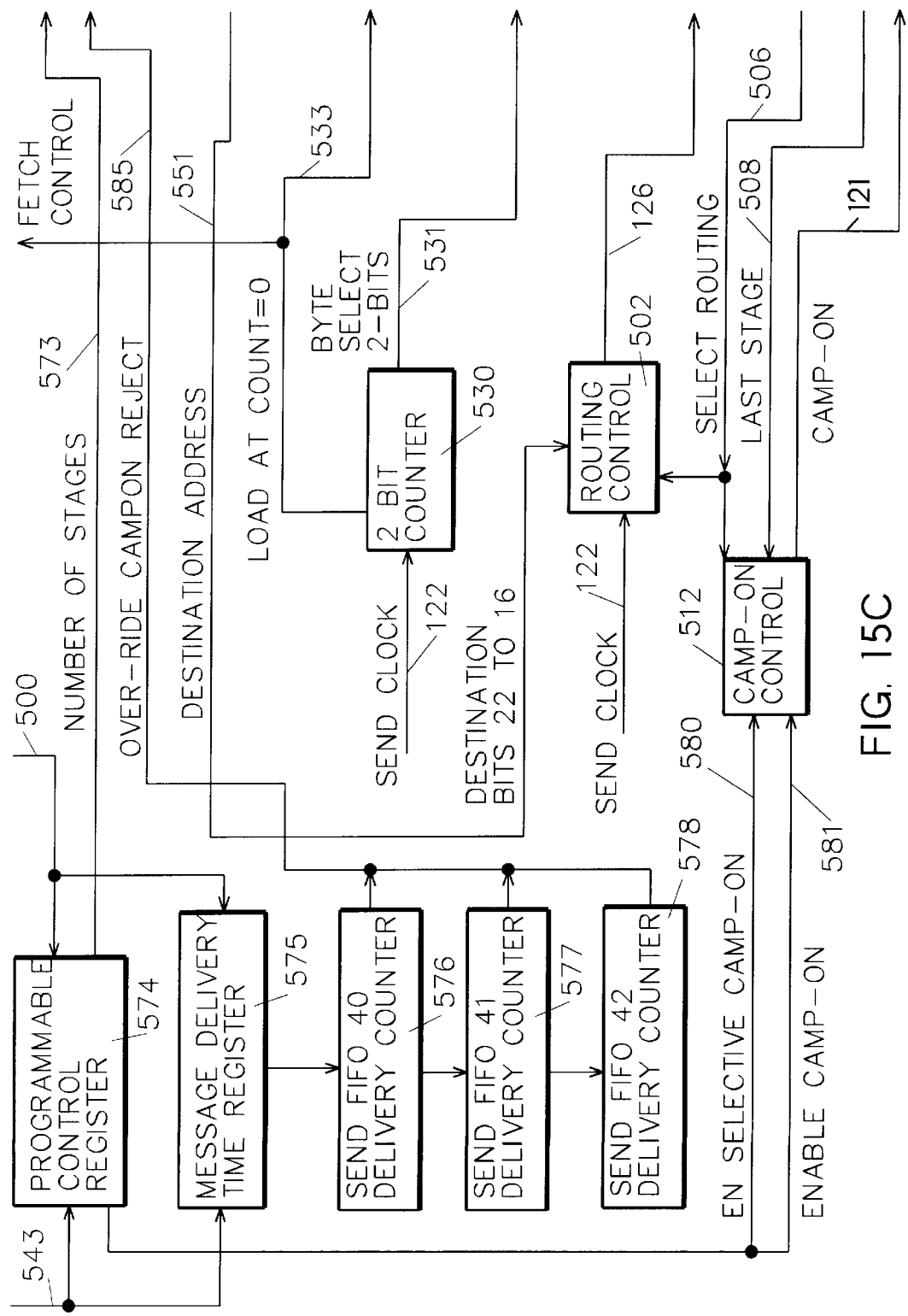
Figure 15D:
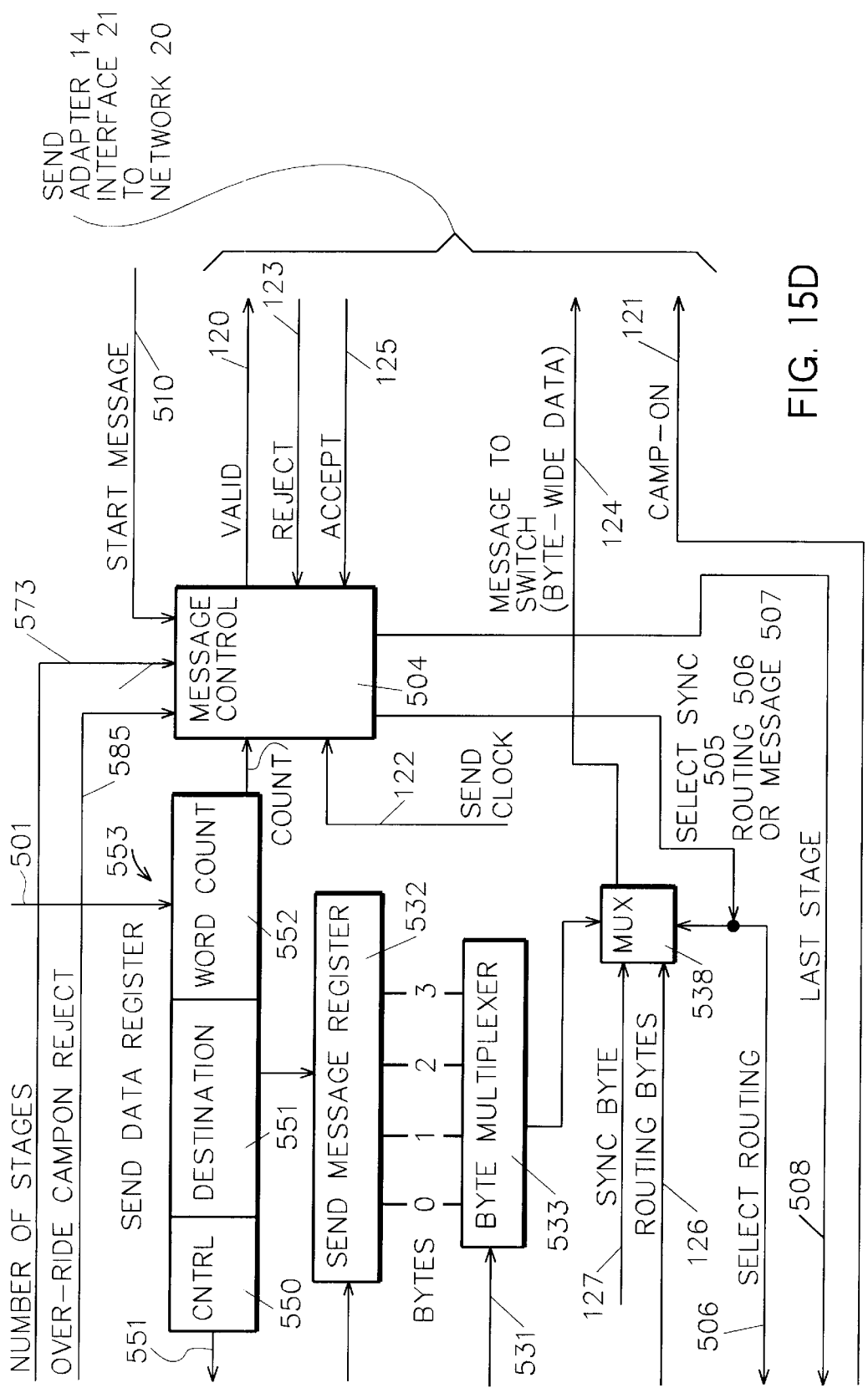

Referring to FIGS. 8A–8B, 10A–10C, and 14, the control logic and timing sequence is shown for accepting a message to output port Y, where output port Y is either 1) not busy and not previously camped-on, or 2) not previously camped-on and transferring a previous message where the number of bytes remaining to be transferred is less than the count in Threshold Register 220. The timing sequence starts with send adapter 14 activating a selective Camp-on command to the last stage of network 20; i.e., Selective Camp-On 131 is issued during the selection of the last stage of the network in conjunction with routing byte (R3) 126. Switch 60 at the last stage responds first by activating the INX-ACCEPT signal 125 with up-level 132 as shown in FIG. 14. Secondly, the Camp-On & Byte Count Controls block 178 compares the value in Bytes Remaining Counter 222 to the value in Threshold Register 220 using Comparator 224. If the count remaining in counter 222 is below the threshold 220, comparator 224 drives the B>A signal 225 to 0. At the time that Selective Camp-On 131 is issued, FIG. 14 shows that the B>A 225 signal is equal to 0, and the B>A or Previous Camp-on signal 363 is also 0 indicating that there are no other inputs ports camped-on to output port Y. Thus, the camp-on commanded is not rejected, but accepted. INX-Accept goes active with pulse 132 and remains active until Bytes Remaining Counter 222 reaches 0 to indicate that the previous message which caused contention is not complete. INX-Accept 125 goes to 0 to inform sending adapter 14 that message 130 can continue, which it does as shown in FIG. 14.

Referring to FIGS. 15A–15D, send adapter 14 will be described in greater detail.

On the processor 50 and adapter memory 18 side of send adapter 14, processor I/O bus 9 is input to address counter 542 and write data register 544. The output of address counter 542 appears on line 543, which is fed to address multiplexer 546, programmable control register 574 and message delivery time register 575. Write data register 544 output is fed on lines 500 to send FIFOs 40, 41, 42, programmable control register 574 and message delivery time register 575. Outputs from programmable control register appear on Enable Selective Campon line 580 and Enable Campon line 581 to campon control block 512, and on Number of Stages line 573 to message control block 504. The output of message deliver time register 574 is fed to send FIFO 40 deliver counter 576, send FIFO 41 delivery counter 577 and send FIFO 42 delivery counter 578, the outputs of which appear on Over-ride Campon Reject line 585 to message control block 504.

Send clock 122 is input to 2-bit counter 530, message control 504, and routing control block 502. The outputs of 2-bit counter 530 are fed on Byte Select line 531 to byte multiplexer 533, on fetch control line 535 to send message register 532 and the Load at Count=0 input to send FIFO read address counter 522.

The inputs to send FIFO control logic block 524 include Send FIFOs Not Empty line 520, and its outputs include the reset line to Send FIFO read address counter 522, increment line 525 to counter 522, and Start Message line 510 to counter 522 and message control 504. Two outputs of address counter 522 are fed to address multiplexer 546, including select line 545. The output of address multiplexer 546 is fed on line 547 to adapter memory 18. Adapter memory 18 includes send FIFOs 40, 41 and 42 and receive FIFOs 44, 45 and 46. The output of adapter memory 18 is fed on memory read bus 501 to send data register 553, which includes control field 550, destination field 551 and word count field 552. The outputs of send data register 553 are fed to message control 504, send message register 532 and on line 551 to routing control 502. Send message register 532 outputs appear on bytes 0, 1, 2 and 3 lines to byte multiplexer 533, the output of which is sent to multiplexer 538 along with sync byte line 127 and routing bytes line 126 from routing control 502. The outputs of message control 504 include select sync line 505, routing line 506 and message line 507 to multiplexer 538, routing control 502 and campon control block 512; and last stage line 508 to campon control block 512. The output of multiplexer 538 is the message to switch on data bus 124. The output of campon control 512 is campon line 121, one of the interface 21 lines to network 20.

On the network side of send adapter 14, interface 21 includes valid line 120, reject line 123, accept line 125, byte-wide data line 124 (which carries the message to the switch), and campon line 121.

Figure 16:
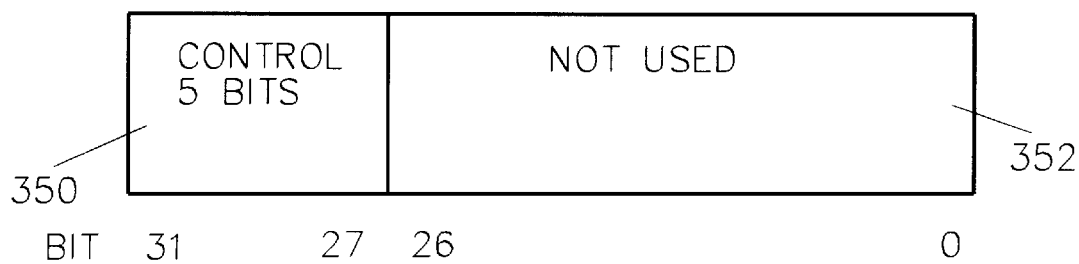
FIG. 16 is a diagram showing the format of the programmable control register at the send adapter according to the preferred embodiment of this invention.

Referring to FIG. 16, programmable control register 574 includes a control field 350, with bit 31 enabling selective campon 500, bit 30 enabling campon 581, and bits 29 to 27 specifying the number of stages 573.

Referring to FIGS. 15A–15D and 16, in operation send adapter 14 forwards messages stored in Send FIFOs 40, 41, 42 in adapter memory 18 of network node 30 to network 20. In this specific, preferred embodiment, messages are stored to Send FIFOs 40, 41, 42 as 32-bit words of 4 bytes each. The message format includes header word 128 and message data words 130. Messages are stored to Send FIFOs 40, 41, 42 by processor 50 over I/O Bus 9 to address counter 542 and write data register 544. The address in address counter 542 goes through address mux 546 to adapter memory 18 and selects which Send FIFO 40, 41, 42 is to store the message. Write data register 544 sends the data to Adapter Memory 18 over Memory Write Bus 500 to the selected Send FIFO, while address counter 542 increments after each word is stored.

Address Counter 542 and Write Data Register 544 are also used to load two control registers in send adapter 14 with programmable controls. These registers appear in memory-mapped space. The first register, called Programmable Control Register 574, contains control data as formatted in FIG. 16. These controls define the number of stages in network 20 and enable two different camp-on options: 1) Selective Camp-On as disclosed in the present invention, and 2) normal Camp-On. One or neither of the camp-on options are enabled prior to processor 50 writing any message to any Send FIFO 40, 41, 42. The second register, called the Message Delivery Time Register 575, is loaded by processor 50 with a large programmable number, which is used to put a time limit upon how long any given message can be delayed from being delivered due to the rejection of selective camp-on commands. This will be explained in more detail hereinafter.

Figure 7B:
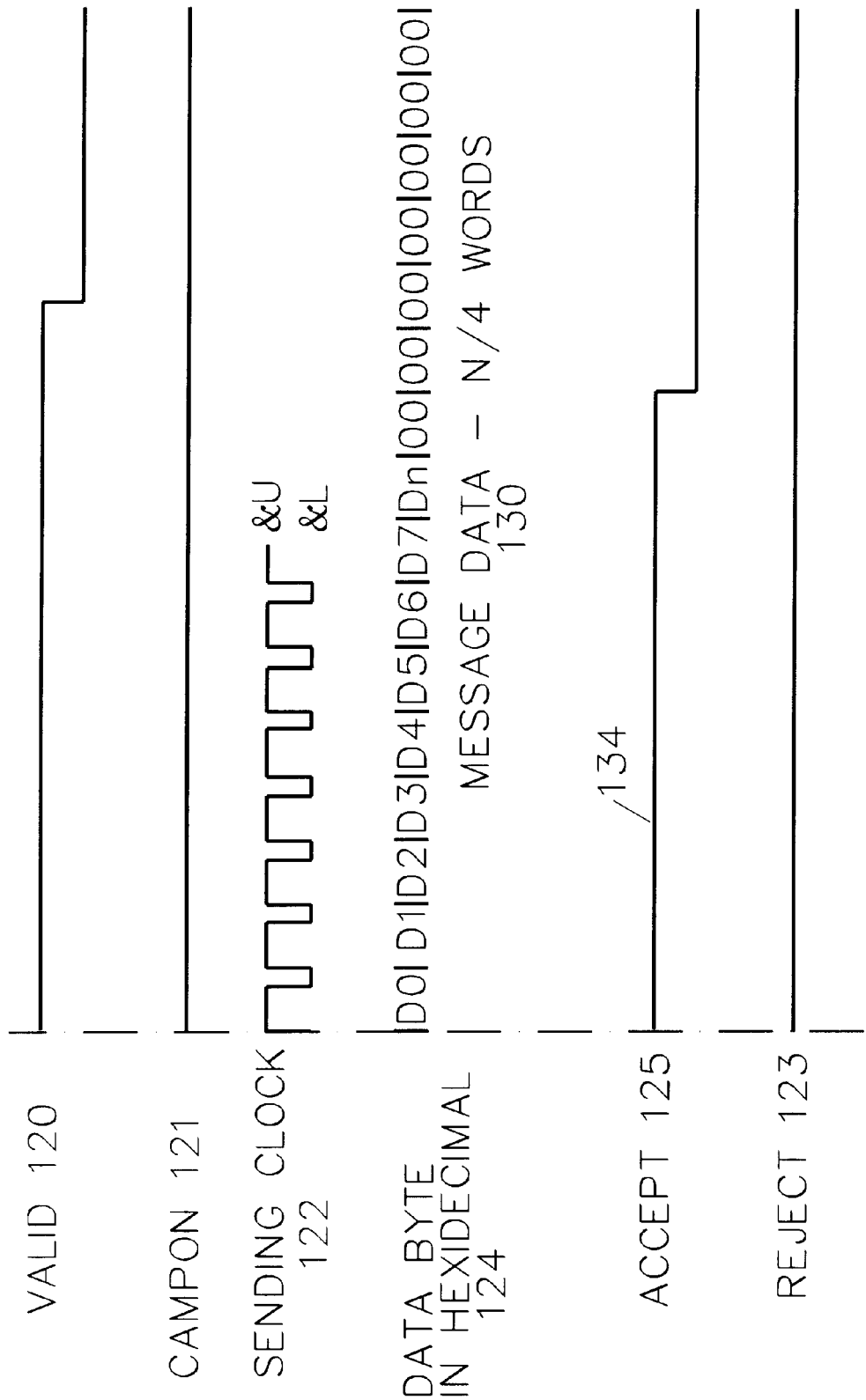

If any of Send FIFOs 40, 41, 42 does not have a message to send to network 20, the FIFOs are empty. If any Send FIFOs 40, 41, 42 does have a message to send to network 20, the FIFOs are NOT empty. Any Send FIFO 40, 41, 42 being NOT empty activates the Send FIFOs Not Empty 520 signal to Send FIFO Control Logic 524, which selects which of the non-empty Send FIFOs 40, 41, 42 is next to send a message to network 20. Send FIFO Control Logic 524 commences the send message operation by activating the Start Message 510 signal. The timing of the send message operation is shown in FIGS. 7A and 7B. The Start Message 510 signal causes Send FIFO Read Address Counter 522 to load the starting address of the next message in the selected Send FIFO 40, 41, 42. Send FIFO Read Address Counter 522 sends the Select signal on line 545 to Address Mux 546 as a selection control signal to cause Address Mux 546 to select the address in Send FIFO Read Address Counter 522 to pass through mux 546 over bus 547 to adapter memory 18. The first word (4 bytes) of the message to be sent to network 20 is read from the selected Send FIFO in adapter memory 18, by accessing the word pointed to by the address in Send FIFO Read Address Counter 522. Then Send FIFO Read Address Counter 522 is incremented by Increment 525 signal, and the next word of the message is accessed. This continues until the entire message is read from the selected Send FIFO or until a rejection of the message is received.

The words read from the selected Send FIFO are accessed via the Memory Read Bus 501. The first word accessed is header word 128, which is placed in Send Data Register 553. The destination portion 551 of Send Data Register 553 is send to network routing control 502, where an alternate path is selected and routing bytes R1, R2, and R3 are generated. The Start Message 510 signal activates Message Control block 504, which controls the send message operation. First, Message Control block 504 activates VALID 120 signal to network 20, and then sends the Select Routing signal 506 to Mux 538, Routing Control 502, and Camp-On Control 512. During the time that Select Routing signal 506 is active, Camp-On Control 512 issues the Camp-on 121 signal to network 20, if Enable Camp-On signal 581 is a 1 based on Bit 30 of the Programmable Control Register 574. If Enable Camp-On signal 581 is a 0, Camp-On 121 is not activated when the Select Routing signal 506 is active. In addition, the Select Routing signal 506 being active to Mux 538 and Routing Control 502, causes Routing Control 502 to generate the Network Routing sequence 126 comprised of R1, R2, and R3 separated by null (00h) bytes. Message Control block 504 tracks the Network Routing sequence 126 being generated by Routing Control 502, and raises the Last Stage 508 signal to the Camp-On Control logic 512 just prior to the Network Routing sequence 126 progressing to R3. During the time that Last Stage signal 508 is active, Camp-On Control 512 issues the CAMP-ON 121 signal to network 20 as a Selective Camp-On, if Enable Selective Camp-On signal 580 is a 1 based on Bit 31 of the Programmable Control Register 574. The Last Stage signal 508 is used here as an example of how to control the sending of a selective camp-on to a particular stage of the network. Likewise, Message Control block 504 could generate the 508 signal to be coincident with any stage or with multiple stages of the network. Thereby, a selective camp-on is sent to any stage of the network. For instance, enabling signal 508 just prior to R1 time, not during R2 time, and just prior to R3 time would result in sending selective camp-on commands to both the first and the last stages of the network. Thus, the selective camp-on or camp-ons can be directed to any stage of the network, but the preferred embodiment is just to send the selective camp-on to the last stage of network 20.

If both bits 31 and 30 are zeroes, neither camp-on function is used to deliver the message across the network as shown in FIGS. 5A and 5B. If Bit 31=1 and bit 30=0, the selective camp-on sequence is used to deliver the message across the network as shown in FIGS. 7A, 7B, 13, and 14. If Bit 30=1, the prior art camp-on sequence as described in U.S. Pat. No. 5,444,705, "Dual Priority Switching Apparatus for Simplex Networks" is used to deliver the message across the network. Bits 29 to 27 of Programmable Control Register 574 define the Number Of Stages 573 in network 20 and are sent to Message Control block 504 to control how many R(N) fields to generate in the Network Routing sequence 126 and when to activate the Last Stage 508 signal.

For the selective camp-On feature, the Last Stage 508 signal stays active until the camp-on has been rejected or accepted as shown in FIGS. 13 and 14, respectively. Message Control block 504, after receiving either Reject 123 equal to 1 or Accept 125 returning to 0, drives the Last Stage 508 signal to 0, which drives Campon 121 to 0. Next Message Control block 504 activates the Select SYNC 505 signal for one clock time to Mux 538, causing it to select and send sync byte 127 (all ones into Mux 538) to the network. Message Control block 504, then, immediately activates the Select Message signal 507 causing header word 128 of the message to begin sending on bus 124, one byte per clock time as selected by Byte Multiplexer 533. The message is read from adapter memory 18 into to Send Data Register 553 to Send Message Register 532 and Byte Multiplexer 533. Byte Multiplexer 533 selects a different byte every clock time as controlled by 2-Bit Counter 122. Every fourth clock time the word in Send Data Register 553 is moved to Send Message Register 532, and the next word of the message is fetched from adapter memory 18 into Send Data Register 553.

Send adapter 14 implements one additional function in relation to the rejection of a selective camp-on command. Everytime the first attempt is made to deliver a new message across the network, the value in Message Delivery Time Register 575 is loaded to one of the three Send FIFO Message Delivery Elapsed Time Counters 576, 577, 578, depending upon which Send FIFO 40, 41, 42 is storing and forwarding the new message. The Message Delivery Time Register 575 usually contains a large (but programmable) number, which is counted down by counters 576, 577, 578 to provide a long but limited time interval in which the message should be delivered. If the delivery counter goes to 0, and the message still has not been delivered, a different (more urgent) delivery algorithm is forced internal to send adapter 14. For instance, message z has continually failed to be transferred because selective camp-ons have been rejected m times; i.e., message z's timing has been such that every retry was rejected because other send adapter 14's in other node 30's had blocked the connection. Message z if allowed to continue along the same path could eventually experience "starvation", which is the inability to be delivered successfully over a long period of time. Delivery counters 576, 577, 578 detect long periods of unsuccessful delivery and take action to prevent starvation.

When message z is retried and its associated message delivery elapsed time counter has gone to 0, a new algorithm is forced to guarantee that message z gets delivered this try. The associated Message Delivery Elapsed Time Counter 576, 577, 578, when going to 0, is used to generate the Over-ride Camp-On Reject signal 585 of FIG. 15, such that if Message Control 504 receives another Reject 123 to this attempt, it ignores (over-rides) the Reject 123 and maintains Campon 121 in the active state. In other words, Message Control 504 does not abort the Camp-On when it sees Reject 123, but instead stays camped-on until the message is accepted. Switch 60 uses a fairness algorithm that guarantees that a sustained camp-on request will be honored before any other user is permitted to win the contended output port a second time.

Advantages over the Prior Art

It is an advantage of the switching apparatus and method of the invention that losses due to contention in non-blocking networks are minimized, particularly when transmitting long messages.

Alternative Embodiments

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A switching network, comprising:

a plurality of switch stages including a first stage, at least one middle stage, and a last stage;

a send adapter for routing and connecting a data message through said plurality of switch stages, said data message selectively including a camp-on command to said last stage; and said last stage including a plurality of output ports each having a threshold and logic responsive to said camp-on command for selectively camping-on a busy output port, accepting said camp-on command, waiting for said output port to become not busy, and then connecting said data message to said output port, or rejecting said camp-on command, when said output port is busy and previously camped-on, or busy and will not be available within said threshold.

2. The switching network of claim 1, said last stage further comprising:

a threshold store;

an snooper for determining the remaining portion of an active message being transferred through said last stage;

controls responsive to said threshold store and said snooper for selectively accepting or rejecting said camp-on command.

3. The switching network of claim 2, said controls being operable to reject said camp-on command when said remaining portion exceeds said threshold store.

4. The switching network of claim 2, said controls being operable to accept said camp-on command when said remaining portion does not exceed said threshold store.

5. The switching network of claim 2, said last stage including a plurality of output ports, and wherein said snooper maintains a count representative of the number of bytes yet to be transferred in active messages across each said output port.

6. The switching network of claim 1, said first and middle stages providing a non-blocking switch network with said last stage being susceptible to contention.

7. The switching network of claim 6, said switching network being an unbuffered network comprising a plurality of circuit switches which transfer messages directly; whereby said messages are transferred without the delays inherent in storing and forwarding.

8. Method for transferring data messages across an unbuffered switching network including a plurality of switch stages from a sending adapter to a last stage output port, comprising the steps of:

operating said sending adapter to select an alternative path through said plurality of switch stages and selectively to issue a camp-on command to said last stage;

providing logic at said last stage output port for storing a predetermined threshold; and operating logic at said last stage responsive to said camp-on command for selectively camping-on a busy output port, accepting the camp-on command, waiting for said output port to become not busy, and then connecting said data messages to said output port, or rejecting said camp-on command, when said output port is busy and previously camped-on, or busy and will not be available within said predetermined threshold.

9. The method of claim 8 comprising the further steps of operating said last stage to snoop the remaining portion of a prior message and to reject said camp-on command when the remaining portion exceeds said predetermined threshold.

10. The method of claim 9 comprising the further step of setting said predetermined threshold from a network node.

11. Method for transferring data messages across an unbuffered switching network including a plurality of switch stages from a sending adapter to a last stage output port, comprising the steps of:

operating said sending adapter to select an alternative path through said plurality of switch stages and selectively to issue a camp-on command to said last stage;

setting a predetermined threshold from a network node;

operating said last stage to snoop the remaining portion of a prior message and to reject said camp-on command when said remaining portion exceeds said predetermined threshold;

maintaining a remaining portion indicia for each of a plurality of output ports at said last stage for comparison with said predetermined threshold in selectively rejecting camp-on commands issued with respect to each said output port; and operating said last stage selectively to accept or reject said camp-on command.

12. A multi-stage switching network, the network comprising:

a plurality of self-routing switches cascaded into first, middle and last stages, each said switch including a plurality of switch inputs and a plurality of switch outputs, each of the switch outputs of each said switch coupled to a different switch input of others of said switches, a plurality of output ports comprising switch outputs of the last stage switches;

a plurality of network input ports comprising switch inputs of the first stage switches;

connection means including normal connection means and selective camp-on connection means;

said normal connection means (1) for establishing a connection path between any one of the network input ports and any one of the network output ports in response to a connection request, said connection path comprising a plurality of connection segments, each connection segment providing the connection of one of said switch inputs to one of said switch outputs at any said network stage; and (2) for cancelling said connection path when any one of said plurality of connection segments is not available; and said selective camp-on connection means responsive to a selective camp-on request (1) for establishing a connection path between any one of the network input ports and any one of the network output ports in response to a selective camp-on connection request; and (2) for holding said connection path until a blocked or busy connection segment becomes available or said selective camp-on connection request is rejected.

13. The multi-stage switching network of claim 12 comprising n stages, and further comprising:

a plurality of nodes, each said node coupled to one of the network output ports and to one of the network input ports, each node comprising:

receiving means for receiving a data message; and sending means for sending a data message across n stages of said switching network responsive to a connection request including n sequential connection commands, each sequential connection command selecting one of said plurality of connection segments for each of the n switch stages of said network, the connection command for the first network stage being transmitted first and the connection command for the last network stage being transmitted last.

14. The multi-stage switching network of claim 13, further comprising:

enabling means for selectively enabling said selective camp-on connection individually at each of said n network stages and for defaulting to said normal connection means for establishing a connection segment upon not enabling said selective camp-on connection.

15. The multi-stage switching network of claim 12 wherein the enabling means at each said switch further comprises:

a means for selecting either normal connection requests or selective camp-on connection requests for establishing connection segments from any switch input port to any switch output port.

16. The multi-stage switching network of claim 13 wherein said connection means further comprises:

asynchronous connection means for asynchronously establishing a plurality of simultaneously active communication paths between a plurality of network input ports and a plurality of network output ports in response to a plurality of connection requests received separately or simultaneously at said plurality of network input ports.

17. The multi-stage switching network of claim 16 further comprising clockless interfaces between each said node and between any two switches.

18. The multi-stage switching network of claim 15, wherein each said switch input port and switch output port further comprises:

a plurality of data lines for sending in parallel said data message, and a plurality of control lines including (1) a rejection control line for signalling back to the sending node a rejection of any connection request, (2) an acceptance control line for signalling back to the sending node the acceptance of a selective camp-on connection request, (3) a valid control line for signalling the activation of the connection means for establishing valid connection paths, and (4) a camp-on control line for signalling the selection of said selective camp-on connection means for establishing a connection segment.

19. The multi-stage switching network of claim 18, wherein each switch of said last stage further comprises cancellation means (1) for cancelling said selective camp-on connection means when a pulse is received on said rejection control line for signalling back to the sending node a rejection of a selective camp-on connection request; and thereupon (2) for deactivating the signal on said camp-on control line.

20. The multi-stage switching network of claim 19, wherein each switch of said last stage further comprises:

means for determining the number of bytes in each said data message being transmitted through said switch, means for storing the determined byte count in one of a plurality byte count registers, each byte count register corresponding to an associated one of said plurality of switch output ports, and means for determining a bytes remaining count for each data message being transmitted to an associated output port by decrementing the corresponding byte count register as each byte of a data message is transferred through said switch.

21. The multi-stage switching network of claim 20, each switch of said last stage further comprising:

a plurality of camp-on queuing means, each said queuing means being associated with one of said plurality of switch output ports;

said camp-on queuing means operable for holding active a plurality of camp-on connection commands received at any of the switch input ports selecting a same switch output port;

selection means (1) for selecting one of the camp-on connection commands held in said camp-on queuing means to establish the next connection segment to said switch output port as soon as the said switch output port becomes available, and (2) for signifying to the sending node of the hold period to establish said connection segment by holding said acceptance control signal active until the requested connection segment is established.

22. The multi-stage switching network of claim 21, each switch of said last stage further comprising:

a plurality of rejection threshold registers, one such rejection threshold register for each said switch output port for storing its programmable threshold value.

23. The multi-stage switching network of claim 22, each said switch of said last stage further comprising:

a plurality of camp-on rejection means, one for each of said plurality of switch output ports, for issuing a camp-on rejection pulse over said rejection control line when a requested connection to the said switch output port is not available and said bytes remaining count for the same switch output port is greater than said programmable threshold value stored in said rejection threshold register for the same switch output port, or there is at least one other camp-on connection command being held active by said camp-on queuing means.

24. The multi-stage switching network of claim 23, said means for sending a data message at each said node further comprising:

a means for cancelling said camp-on connection command by deactivating said camp-on control signal and by generating and transmitting a pulse on said rejection control line to said sending node.

25. The multi-stage switching network of claim 24, said means for sending a data message at each said node further comprising:

means for improving the efficiency of sending said data messages through said network by requesting said first and middle stages to establish connection segments using said normal connection means and said last stage to establish the last connection segment using said selective camp-on connection means, wherein said selective camp-on connection command is sent to said network by activating said camp-on control line to said network while said last connection command is being transmitted.

26. The multi-stage switching network of claim 25, said means for sending a data message at each said node further comprising:

elapsed time counter means for storing a maximum delivery time constant at the initiation of each data message;

means for decrementing said elapsed time counter means during data message delivery to establish a data message delivery elapsed time for defining the period of time cancelling camp-on requests.

27. The multi-stage switching network of claim 26, said means for sending a data message at each said node further comprising:

means for over-riding a camp-on rejection pulse when said camp-on rejection pulse is received on said rejection control line for signalling back to the sending node a rejection of a camp-on connection command when said elapsed time counter has counted down to 0; and means for maintaining the camp-on request to said network and maintaining the camp-on signal to said camp-on queuing means until said data message is accepted over said network.

* * * * *